United States Patent
Takahashi et al.

(10) Patent No.: US 6,282,197 B1
(45) Date of Patent: Aug. 28, 2001

(54) ATM SWITCHING APPARATUS AND ATM COMMUNICATIONS NETWORK

(75) Inventors: Satoshi Takahashi; Yoshihiro Watanabe; Kohei Ueki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/013,697

(22) Filed: Jan. 26, 1998

(30) Foreign Application Priority Data

Mar. 17, 1997 (JP) .................................................. 9-063642

(51) Int. Cl.⁷ .......................... H04L 12/28; H04L 12/26; H04J 1/16; H04J 3/14
(52) U.S. Cl. .......................... 370/395; 370/398; 370/412; 370/418; 370/230; 370/232
(58) Field of Search .................................... 370/395, 396, 370/399, 377, 400, 230, 237, 248, 252, 253, 235, 391, 398, 412, 418

(56) References Cited

U.S. PATENT DOCUMENTS

| | | | |
|---|---|---|---|
| 5,067,123 | * 11/1991 | Hyodo et al. ........................ | 370/58.1 |
| 5,303,236 | * 4/1994 | Kunimoto et al. .................. | 370/60.1 |
| 5,315,586 | * 5/1994 | Charvillat ............................ | 370/60 |
| 5,677,906 | * 10/1997 | Hayter et al. ........................ | 370/235 |
| 5,748,632 | * 5/1998 | Honda et al. ........................ | 370/399 |
| 5,889,779 | * 3/1999 | Lincoln ................................ | 370/398 |
| 5,894,471 | * 4/1999 | Miyagi et al. ....................... | 370/230 |
| 5,953,338 | * 9/1999 | Ma et al. ............................. | 370/395 |

FOREIGN PATENT DOCUMENTS

| | | |
|---|---|---|
| 673 138 | 9/1995 | (EP) . |
| 785 652 | 7/1997 | (EP) . |
| 5-268240 | 10/1993 | (JP) . |
| 97 02685 | 1/1997 | (WO) . |

OTHER PUBLICATIONS

The ATM Forum Technical Committee; Private Network–Network Interface Specification Version 1.0 (PNNI 1.0), Mar. 1996.

* cited by examiner

Primary Examiner—Huy D. Vu
Assistant Examiner—M. Phan
(74) Attorney, Agent, or Firm—Helfgott & Karas, PC.

(57) ABSTRACT

Disclosed is an ATM switching apparatus capable of reducing a probability an IAM acceptance being rejected due to a difference in bandwidth acquiring algorithm. The ATM switching apparatus is constructed such that when receiving an IAR due to the difference in bandwidth calculation algorithm for the IAM indicating a use of a certain VPC, a calculated bandwidth value is set in an estimated free bandwidth value about the VPC within a bandwidth management table, a value given by Calculation Bandwidth Value/Free bandwidth Value is set in a ratio, and the VPC is selected by using not the free bandwidth value but the estimated free bandwidth value (=Free Bandwidth Value× Ratio) when transmitting the IAM. It is another contrivance that when the free bandwidth value changes, the estimated free bandwidth value is also changed to establish "Estimated Free Bandwidth Value=Free Bandwidth Value×Ratio" without changing the ratio.

11 Claims, 19 Drawing Sheets

FIG. 4

(a) INITIAL STATE (T=T₀)

| VPCI | FREE BANDWIDTH VALUE | ESTIMATED FREE BANDWIDTH VALUE | RATIO |
|---|---|---|---|
| #1 | 10.0 | 10.0 | 1.0 |
| #2 | 20.0 | 20.0 | 1.0 |
| #3 | 40.0 | 40.0 | 1.0 |

⇩
CONNECTION REQUEST A → IAM(A:#1) → REJECTION MESSAGE
(CALCULATION BANDWIDTH VALUE 9) ⇩

(b)

| VPCI | FREE BANDWIDTH VALUE | ESTIMATED FREE BANDWIDTH VALUE | RATIO |
|---|---|---|---|
| #1 | 10.0 | 9.0 | 0.9 |
| #2 | 20.0 | 20.0 | 1.0 |
| #3 | 40.0 | 40.0 | 1.0 |

⇩
→ IAM(A:#2) → APPROVAL MESSAGE
⇩

(c)

| VPCI | FREE BANDWIDTH VALUE | ESTIMATED FREE BANDWIDTH VALUE | RATIO |
|---|---|---|---|
| #1 | 10.0 | 9.0 | 0.9 |
| #2 | 11.0 | 11.0 | 1.0 |
| #3 | 40.0 | 40.0 | 1.0 |

⇩
RESPONSES TO VARIOUS CONNECTION REQUESTS AND RELEASE REQUESTS (T<T₀+dT) ⇩

(d)

| VPCI | FREE BANDWIDTH VALUE | ESTIMATED FREE BANDWIDTH VALUE | RATIO |
|---|---|---|---|
| #1 | 10.0 | 8.5 | 0.85 |
| #2 | 20.0 | 18.0 | 0.9 |
| #3 | 40.0 | 38.0 | 0.95 |

⇩
T=T₀+dT
⇩

(e)

| VPCI | FREE BANDWIDTH VALUE | ESTIMATED FREE BANDWIDTH VALUE | RATIO |
|---|---|---|---|
| #1 | 10.0 | 8.6 | 0.86 |
| #2 | 20.0 | 18.2 | 0.91 |
| #3 | 40.0 | 38.4 | 0.96 |

FIG. 7

| V P C I | FREE BANDWIDTH VALUE | ESTIMATED VALUE | $r_1$ | $r_2$ | $r_3$ | $r_4$ | $r_5$ | RATIO |
|---|---|---|---|---|---|---|---|---|
| # 1 | | | | | | | | |
| # 2 | | | | | | | | |
| # 3 | | | | | | | | |

| VPCI | FREE BANDWIDTH VALUE | CBR | | VBR | | UBR | | ABR | |
|---|---|---|---|---|---|---|---|---|---|
| | | ESTIMATED VALUE | RATIO | ESTIMATED VALUE | RATIO | ESTIMATED VALUE | RATIO | ESTIMATED VALUE | RATIO |
| #1 | | | | | | | | | |
| #2 | | | | | | | | | |
| #3 | | | | | | | | | |

FIG. 16
PRIOR ART (1)
```
     8  7  6  5  4  3  2  1
     0  1  0  1  1  1  1  0    1
     1  CODING    ACTION INDICATOR    2
        STANDARD
        LENGTH OF B-BC CONTENT      3
                                    4
     0/1  SPARE      BEARER CLASS   5
     1   SPARE  TRAFFIC  TIMING     5a  ← ONLY PRESENT IF BEARER
                 TYPE   REQUIREMENTS         CLASS IS BCOB-X
     1  SUSCEPTIBILITY  SPARE  USER PLANE   6
        TO CLIPPING            CONNECTION
                               CONFIGURATION
```

(2)
| BEARER CLASS | |
|---|---|
| BITS 5 4 3 2 1 | |
| 0 0 0 0 1 | BCOB-A |
| 0 0 0 1 1 | BCOB-C |
| 1 0 0 0 0 | BCOB-X |
| ALL OTHER VALUES RESERVED | |

(3)
| TRAFFIC TYPE | |
|---|---|
| BITS 5 4 3 | |
| 0 0 0 | NOT INDICATED |
| 0 0 1 | CONSTANT BIT RATE (CBR) |
| 0 1 0 | VARIABLE BIT RATE (VBR) |
| ALL OTHER VALUES RESERVED | |

(4)
| TIMING REQUIREMENT | |
|---|---|
| BITS 2 1 | |
| 0 0 | NOT INDICATED |
| 0 1 | END-TO-END TIMING REQUIRED |
| 1 0 | END-TO-END TIMING NOT REQUIRED |
| 1 1 | RESERVED |

(5)
| SUSCEPTIBILITY TO CLIPPING | |
|---|---|
| BITS 7 6 | |
| 0 0 | SUSCEPTIBLE |
| 0 1 | NOT SUSCEPTIBLE |
| ALL OTHER VALUES RESERVED | |

(6)
| USER PLANE CONNECTION CONFIGURATION | |
|---|---|
| BITS 2 1 | |
| 0 0 | POINT-TO-POINT |
| 0 1 | POINT-TO-MULTIPOINTS |
| ALL OTHER VALUES RESERVED | |

FIG. 17 PRIOR ART

| ATM TRANSFER CAPABILITY (OCTET 5a) | |
|---|---|
| BITS 7 6 5 4 3 2 1 | |
| 0 0 0 0 0 1 1 | STATISTICAL BIT RATE (CONSTANT BIT RATE) |
| 0 0 0 0 1 0 1 | CONSTANT BIT RATE (END-TO-END TIMING REQUIRED) |
| 0 0 0 0 1 1 1 | DETERMINISTIC BIT RATE (VARIABLE BIT RATE) |
| 0 0 0 1 0 0 1 | VARIABLE BIT RATE (END-TO-END TIMING REQUIRED) |
| 0 0 0 1 0 1 0 | VARIABLE BIT RATE (END-TO-END TIMING NOT REQUIRED) |

ATM SWITCHING APPARATUS AND ATM COMMUNICATIONS NETWORK

BACKGROUND OF THE INVENTION

1. Field of the Invention

The present invention relates to an ATM switching apparatus and an ATM communications network, which offers SVC (Switched Virtual Connection) services.

2. Description of the Related Art

Services offered in a B-ISDN (Broadband-Integrated Service Digital Network) constructed of ATM switching apparatuses are classified into connection-oriented services and connectionless services. The connection oriented services thereof are subdivided into a PVC (Permanent Virtual Connection) service in which a calling user and a bandwidth are semi-permanent, and an SVC (Switched Virtual Connection) service in which the communication connection is dynamically established according to the called user, the bandwidth and a quality of service that are declared from a calling user.

Standardization of signalling protocols at a user-network interface (UNI) and network-node interface (NNI) for actualizing the SVC service, is advanced stepwise (the way in which the functions are extended) by the ITU-T (International telecommunication Union-Telecommunication Standardization Sector) as a main organization. The signaling protocols at the UNI and NNI for B-ISDN are respectively known as DSS2 (Digital Signalling System No. 2) and B-ISUP (B-ISDN User Part).

Hereinafter, an outline of the DSS2 and B-ISUP will be explained. First, formats of DSS2, B-ISUP messages are explained.

DSS2 message, as shown in FIG. 11, is composed of a protocol discriminator, a call reference length, a call reference, a message type, a message length, and some information elements.

The protocol discriminator is information identifying the specific protocol in which the message are to be interpreted, and is set to "00001001" for the DSS2 message. The call reference length is information specifying the number of octets used for the call reference. The call reference is information identifying the connection to which the message pertains. Note that the call reference identifies the connection at the local UNI only, but has no end-to-end significance. That is, a connection is identified by two independent call references valid at the near-end and far-end UNIs.

The message type is information identifying the specific type of message, such as SETUP, CONNECT, and so on. The message length is information specifying the number of octets used for the information elements, and is set to 0000H when the message contains no information element. All DSS2 messages must contain the protocol discriminator, the call reference length, the call reference, the message type and the message length, and so they are at least nine octets long.

Each of the information elements prepared for DSS2 messages consists of an information element identifier, a coding standard, an information element instruction field, an information element content length and information element content.

The element identifier is information identifying the information element. The coding standard is information identifying the regulation with which the information element are coded, and is usually set to "00" for ITU-T coding. The information instruction field contains an action indicator indicating the receiving node how to act (clear call, discard and proceed, and so on) when the information element cannot be interpreted, and a flag bit indicating whether or not the action indicator is to be followed. The information element content length is information specifying the number of octets used for the information element content.

The set of DSS2 messages is divided into call establishment messages, call clearing messages, messages used during the information phase of the connection, and a set of miscellaneous messages. Each DSS2 message may contain multiple information elements, some are mandatory and some are optional, depending on the type and its use.

B-ISUP message, as shown in FIG. 12, is composed of MTP (Message Transfer Protocol)-3 header, a message type, a message length, a message compatibility information and some parameters.

The MTP-3 header is composed of a service information octet (SIO) indicating the specific protocol in which the message are to be interpreted, and a routing label. The routing label is used to route the message from one switching apparatus to another. It is composed of a destination point code (DPS), an originating point code (OPS), and a signalling link selection number (SLS). The DPS is the address of the switching apparatus to which the message must be delivered and the OPS is the address of the switching apparatus which originates the message. The SLS defines a virtual routes between the switching apparatuses. It is used assign the messages belonging to different transactions to separate routes.

The message type is information to identify the particular function carried out by the message. The message length specifies the number of octets used for the message compatibility information and the parameters. The message compatibility information indicates the receiving node how to act (disconnect call, ignore this message, and so on) in case that the message cannot be interpreted.

Each of the parameters prepared for B-ISUP messages is composed of a parameter name, a parameter length, parameter compatibility information and parameter contents. The parameter name is information identifying the parameter. The parameter length is information specifying the number of octets used for the parameter compatibility information and the parameter content. The parameter compatibility information is information indicating a node, which receives this parameter, how to act in case that the parameter cannot be interpreted.

The DSS2 and the B-ISUP are separate protocols, however, their messages, information elements and parameters are closely associated with each other.

For example, as shown in FIG. 13, an IAM (Initial address message), which is a B-ISUP message corresponding to the DSS2 SETUP message, may contain parameters corresponding to information elements used in the SETUP message. As shown in FIG. 14, an ANM (Answer message), which is a B-ISUP message corresponding to the DSS2 CONNECT message, may contain parameters corresponding to information elements used in the CONNECT message.

Next, an outline of a call set up operation using the DSS2 and B-ISUP will be explained by exemplifying a case of setting a call between two terminals (calling and called terminals) via two switching apparatuses (originating and destination switching apparatuses).

The call set up operation starts when the calling terminal sends to the originating switching apparatus (switching apparatus accommodating the calling terminal itself) the SETUP message containing pieces of information elements such as a called party number information element, an ATM traffic descriptor information element, a broadband bearer capability information element, a QOS (quality of service) parameter information element and so on.

The ATM traffic descriptor information element, as shown in FIG. 15, contains set of traffic parameters. The broadband bearer capability information element, as shown in FIG. 16, contains information indicating the broadband service to be offered. Note that the broadband bearer capability information element shown in FIG. 16 is that defined in the recommendation Q.2931. In the new recommendation Q.2931.2, it is defined that octet 5a of the broadband bearer capability information element is used as an ATM transfer capability field as shown in FIG. 17.

Upon receiving the SETUP message, the originating switching apparatus recognizes a destination switching apparatus from the called party number contained in the SETUP message. Then, it recognizes the virtual path connections (VPCs) provided between the destination switching apparatus and the originating switching apparatus itself.

Subsequently, it calculates a bandwidth value to be reserved for the call (connection) requested on the basis of the ATM traffic descriptor information element, a broadband bearer capability information element, a QOS (quality of service) parameter information element and so on (hereinafter referred to as bandwidth negotiation data) contained in the SETUP message. Using the calculated bandwidth value and a using condition (a free bandwidth value) of each VPC, the originating switching apparatus selects one VPC which can be used for the requested connection. Note that this selection is made by specifying the VPC whose free bandwidth value is over the calculated bandwidth value and has a minimum difference from the calculated bandwidth value.

After selecting the VPC, the originating switching apparatus sends to the destination switching apparatus the IAM containing a connection element identifier parameter in which the identifier of the selected VPC, namely VPCI, is set along with a variety of parameters corresponding to the information elements included in the SETUP message through a VC (Virtual Channel) for signalling.

The destination switching apparatus receiving the IAM at first calculates a bandwidth to be reserved for the requested connection using the bandwidth negotiation data contained in the IAM. Then, it judges whether the IAM should be accepted on the basis of the calculated bandwidth value and the using condition of the VPC whose VPCI is set in the IAM.

If accepted, the destination switching apparatus sends an IAA (IAM Acknowledgement message), format thereof is shown in FIG. 18, indicating that the IAM has been accepted to the originating switching apparatus. Thereafter, if the called terminal is in a free status, the destination switching apparatus sends a SETUP message to the called terminal and sends an address completion message ACM.

The called terminal receiving the SETUP message returns to the destination switching apparatus and returns a CONNECT message a CALL PROC message indicating that a call establishment has began.

The destination switching apparatus receiving the CALL PROC message sends to the originating switching apparatus a call progress message CPG indicating that call is being processed without problems. The originating switching apparatus receiving the CPG sends an ALERTING message to the calling terminal.

Moreover, the destination switching apparatus, when receiving the CONNECT message, sends an answer message ANM indicating that the called terminal has answered the call to the originating switching apparatus. The originating switching apparatus receiving the ANM sends a CONNECT message to the calling terminal, whereby the calling and called terminals are brought into a communicable status.

On the other hand, when the destination switching apparatus judges that the IAM is not acceptable, it sends an IAR (IAM Reject message), format thereof is shown in FIG. 19, indicating that the IAM is refused due to the unavailability of resources to the originating switching apparatus.

When receiving the IAR, the originating switching apparatus selects another VPC, and sends to the destination switching apparatus a new IAM containing the VPCI of the newly selected VPC and the data negotiating information. The destination switching apparatus processes the new IAM, and sends, if the IAM is acceptable, an IAA to the originating switching apparatus. Then, after some messages are transmitted between the switching apparatuses and the terminals, the requested call is established.

Thus, in the ATM network, each switching apparatus receiving the IAM calculates a bandwidth value to be reserved on the basis of the bandwidth negotiation data, and judges whether or not the IAM is acceptable by comparing the calculated bandwidth value with the free bandwidth value. That is, DSS2 and B-ISUP allow the ATM network to contain switching apparatuses having different bandwidth calculation algorithms, and hence, used are a variety of switching apparatus having different bandwidth calculation algorithms in the ATM network.

Specifically, services offered by the ATM network can be classified into constant bit rate (CBR) service, variable bit rate (VBR) service, available bit rate (ABR) service, and unspecified bit rate (UBR) service.

Among these services, the UBR service offers no guarantee at all. (This does not imply, of course, that the most part of the data will be discarded.) Therefore, it is unnecessary to reserve bandwidth for a UBR connection. However, known are a switching apparatus which accepts a UBR connection request only when a bandwidth of X % (e.g. 5%) of the declared peak cell rate (PCR) can be reserved, and a switching apparatus which accepts a UBR connection request only when the number of connections which has been established is within the predetermined number.

The CBR service guarantees bandwidth and delay. Consequently, each switching apparatus is generally so constructed to reserve, when accepting a CBR connection request, the bandwidth the value of which is PCR/Y. Here, the Y is a constant value ($\leq 1$) established on the basis of the buffer size. In the switching apparatus having relatively large buffer, "1" is used as the Y. In the switching apparatus having smaller buffer, smaller value (e.g. 0.95) is used as the Y.

Call set up operation using the DSS2 and B-ISUP allows to set up a call across the switching apparatuses having such different bandwidth calculation algorithms, however, each conventional switching apparatus is so constructed, as discussed above, as to select a VPC whose free bandwidth value is over the calculated bandwidth value and has a minimum difference from the calculated bandwidth value for establishing the call, and to send the IAM indicating the use of the selected VPC to the next switching apparatus.

Consequently, in the conventional ATM network, when a connection which needs a bandwidth nearly equal to the free bandwidth value is established, there is high a high probability that the IAM is rejected due to a difference of the bandwidth calculating algorithms. When the IAM is rejected, the switch apparatus which issued the IAM must select other VPC and re-sent the IAM, with the result that call setting takes a comparatively long time.

Note that, in order to reduce the probability that the IAM is rejected due to a difference of the bandwidth calculating algorithm, the switching apparatus may be constructed so that the VPCs are selected sequentially from those having larger free bandwidth. In the thus constructed switching apparatus, however, it follows that the respective VPCs are used in such a form as to make smaller the maximum of the free bandwidth values of the plurality of VPCs. Namely, the respective VPCs are used in such a form as to have a smaller probability that the VPC having the larger free bandwidth might be left in the ATM switching apparatus concerned than in the ATM switching apparatus wherein the VPCs are selected sequentially from those having smaller free bandwidth.

SUMMARY OF THE INVENTION

It is a primary object of the present invention, which was contrived to obviate the problems described above, to provide an ATM switching apparatus capable of decreasing a probability of a connection establishing request being rejected, and of selecting a VPC in such a form that a VPC bandwidth is effectively utilized.

To accomplish this object, according to a first aspect of the present invention, an ATM switching apparatus comprises (A) a storage unit for storing free bandwidth values and ratios relative to the plurality of respective virtual path connections, (B) a calculating unit for calculating, when receiving a connection establishing request indicating to set up a connection to the facing node, a necessary bandwidth value defined as a bandwidth value necessary for the connection the basis of bandwidth negotiation data in the connection establishing request, (C) a selecting unit for selecting, from the plurality of virtual path connections, such a virtual path connection that a result of multiplication of the free bandwidth value and the ratio that are stored in the storage unit exceeds the necessary bandwidth value calculated by the calculating unit and is most approximate to the necessary bandwidth value, (D) a transmitting unit for transmitting, to the facing node, a connection establishing request containing information indicating a use of the virtual path connection selected by the selecting unit, and (E) a ratio rewriting unit for rewriting, when receiving a rejection message indicating a rejection of acceptance of the connection establishing request transmitted by the transmitting unit, a ratio stored in said storage unit and relative to the virtual path connection selected by the selecting unit into a value obtained by dividing the necessary bandwidth value by the free bandwidth value relative to that virtual path connection.

In the ATM switching apparatus having such a construction according to the first aspect thereof, the storage unit is stored with, as a ratio, the information on a difference in terms of a bandwidth calculation algorithm with respect to the facing node, and hence it follows that a possible-of-setting-call status is to be attained in a state of gradually decreasing a probability that an acceptance of the connection establishing request (IAM) is rejected due to the above difference. As a result, the ATM switching apparatus according to the first aspect thereof is capable of setting the call at a high speed.

According to a second aspect of the present invention, an ATM switching apparatus is used in combination with a facing node defined as an ATM switching apparatus for, when rejecting the connection establishing request, transmitting a rejection message containing a facing node free bandwidth value defined as a free bandwidth value of a virtual path connection indicated to be used at that connection establishing request.

The ATM switching apparatus according to the second aspect comprises (A) a storage unit for storing free bandwidth values and ratios relative to the plurality of respective virtual path connections, (B) a calculating unit for calculating, when receiving a connection establishing request indicating to set up a connection to the facing node, a necessary bandwidth value defined as a bandwidth value necessary for the connection the basis of bandwidth negotiation data in the connection establishing request, (C) a selecting unit for selecting, from the plurality of virtual path connections, such a virtual path connection that a result of multiplication of the free bandwidth value and the ratio that are stored in the storage unit exceeds the necessary bandwidth value calculated by the calculating unit and is most approximate to the necessary bandwidth value, (D) a transmitting unit for transmitting, to the facing node, a connection establishing request containing information indicating a use of the virtual path connection selected by the selecting unit, and (E) a ratio rewriting unit for rewriting, when receiving a rejection message indicating a rejection of acceptance of the connection establishing request transmitted by the transmitting unit, a ratio stored in the storage unit and relative to the virtual path connection selected by the selecting unit into a value obtained by dividing the facing node free bandwidth value set in that rejection message by the free bandwidth value relative of the relevant virtual path connection.

In the ATM switching apparatus having the above construction according to the second aspect, the storage unit is more precisely stored with, as a ratio, information indicating the difference in the bandwidth calculation algorithm with respect to the facing node than in the ATM switching apparatus according to the first aspect. Therefore, according to the present ATM switching apparatus, it follows that the call setting an be actualized in the state of decreasing the probability that the acceptance of the connection establishing request (IAM) is rejected due to the above difference.

When constructing the ATM switching apparatus according to the present invention, what is adopted as the storage unit is a unit for storing free bandwidth values and a plurality of ratios corresponding to respective service classes with respect to the plurality of respective virtual path connections. In this case, as the selecting unit, there may be adopted a unit which obtains a result of multiplication of the free bandwidth value and the ratio corresponding to the service class designated by the bandwidth negotiation data among the ratios relative to the plurality of virtual path connections stored in the storage unit, and selects the virtual path connection in which the result of multiplication exceeds the necessary bandwidth value calculated by the calculating unit and is most approximate to the necessary bandwidth value. As the ratio rewriting unit, there may be adopted a unit which rewrites a value of the ratio in the storage unit that corresponds to the service class designated by the bandwidth negotiation data in connection with the virtual path connection selected by the selecting unit into a value obtained by dividing the necessary bandwidth value by the free bandwidth value relative to the relevant virtual path connection.

Further, there may be added a ratio element data storage unit for storing predetermined pieces of ratio element data with respect to the respective ratios stored in the storage unit. As the ratio rewriting unit, there may be adopted a unit which rewrites the ratio element data written in the farthest past to the ratio element data storage unit with the value obtained by the division, calculates a statistic value of the ratio element data stored in the ratio element data storage unit, and rewrites a value of the target ratio with the calculated statistic value.

Moreover, as the selecting unit, there may be adopted a unit which selects the virtual path connection with the maximum free bandwidth value if there exist a plurality of virtual path connections in which the result of multiplication of the ratio stored in the storage unit and the free bandwidth value exceeds the necessary bandwidth value calculated by the calculating unit and is most proximate to the necessary.

Further, as the ratio rewriting unit, there may be adopted a unit which rewrites the value of the ratio only when the calculated value is smaller than the value of the ratio stored in the storage unit.

Furthermore, when constructing the ATM switching apparatus according to the present invention, it is desirable that there be added a ratio changing unit for changing the value of each ratio stored in the storage unit at an interval of a predetermined time into a ratio initial value.

Incidentally, as such a ratio changing unit, there may be used a unit for calculating a value into which a fixed value is added to the value of each ratio stored in the storage unit at an interval of a predetermined time, changing the value of the ratio in which the calculated value does not exceed the ratio initial value into the calculated value, and changing the value of the ratio in which the calculated value exceeds the ratio initial value into the ratio initial value.

Further, there may be used a ratio changing unit for counting the number of acknowledgement messages per virtual path connections, which are transmitted from the facing node as a response to the connection establishing request transmitted by the transmitting unit, and changing the value of the ratio relative to the virtual path connection in which a count value is over a predetermined count value, into the ratio initial value.

Moreover, there may be used a ratio changing unit for counting the number of acknowledgement messages transmitted from the facing node as a response to the connection establishing request transmitted by the transmitting unit, calculating a value into which a fixed value is added to the value of the ratio relative to the virtual path connection in which a count value is over a predetermined count value, changing, if the calculated value does not exceed the ratio initial value, the value of the ratio relative to the relevant virtual path connection into the calculated value, and changing, if the calculated value exceeds the ratio initial value, the value of the ratio relative to the relevant virtual path connection into the ratio initial value.

Furthermore, as the storage unit, there may be adopted a unit for storing not the ratio per virtual path connection but a ratio used in common to the respective virtual path connections.

An ATM communications network according to the present invention allocates a virtual path connecting two ATM switching apparatuses in order to establish a call. In this network, one ATM switching apparatus transmits, to other ATM switching apparatus, an establishing request containing information on a virtual path selected for the call among a plurality of virtual paths. The other switching apparatus transmits back to said one ATM switching apparatus an acknowledgement reply containing management information about the virtual path contained in the establishing request, and one ATM switching apparatus allocates the virtual path on the basis of the management information contained in the acknowledgement reply.

According to a third aspect of the present invention, an ATM switching apparatus is prepared with a plurality of virtual path connections to a facing node defined as other ATM switching apparatus. This ATM switching apparatus comprises a first storage unit for storing free bandwidth values and ratios relative to the plurality of respective virtual path connections, and a selecting unit for selecting a virtual path connection from the plurality of virtual path connections on the basis of the necessary bandwidth value calculated by the calculating unit and a free bandwidth value stored in the first storage unit. The ATM switching apparatus further comprises a transmitting unit for transmitting, to the facing node, a connection establishing request containing information indicating a use of the virtual path connection selected by the selecting unit, and a second storage unit for receiving, from the facing node, a message containing free bandwidth value information in the facing node with respect to said virtual path connection, and for storing the free bandwidth value information.

BRIEF DESCRIPTION OF THE DRAWINGS

Other objects and advantages of the present invention will become apparent during the following discussion in conjunction with the accompanying drawings, in which:

FIG. 4 is an explanatory diagram showing how a content of a bandwidth management table changes corresponding to an operation of the ATM switching apparatus in the first embodiment;

FIG. 7 is an explanatory diagram of the bandwidth management table provided in the ATM switching apparatus in a third embodiment;

FIG. 9 is an explanatory diagram of the bandwidth management table provided in the ATM switching apparatus in a fourth embodiment;

FIG. 16 is a explanatory diagram of an broadband bearer capability information element;

FIG. 17 is a explanatory diagram of an ATM transfer capability;

DESCRIPTION OF THE PREFERRED EMBODIMENTS

Embodiments of the present invention will hereinafter be described with reference to the accompanying drawings.

<First Embodiment>

Figure 1:
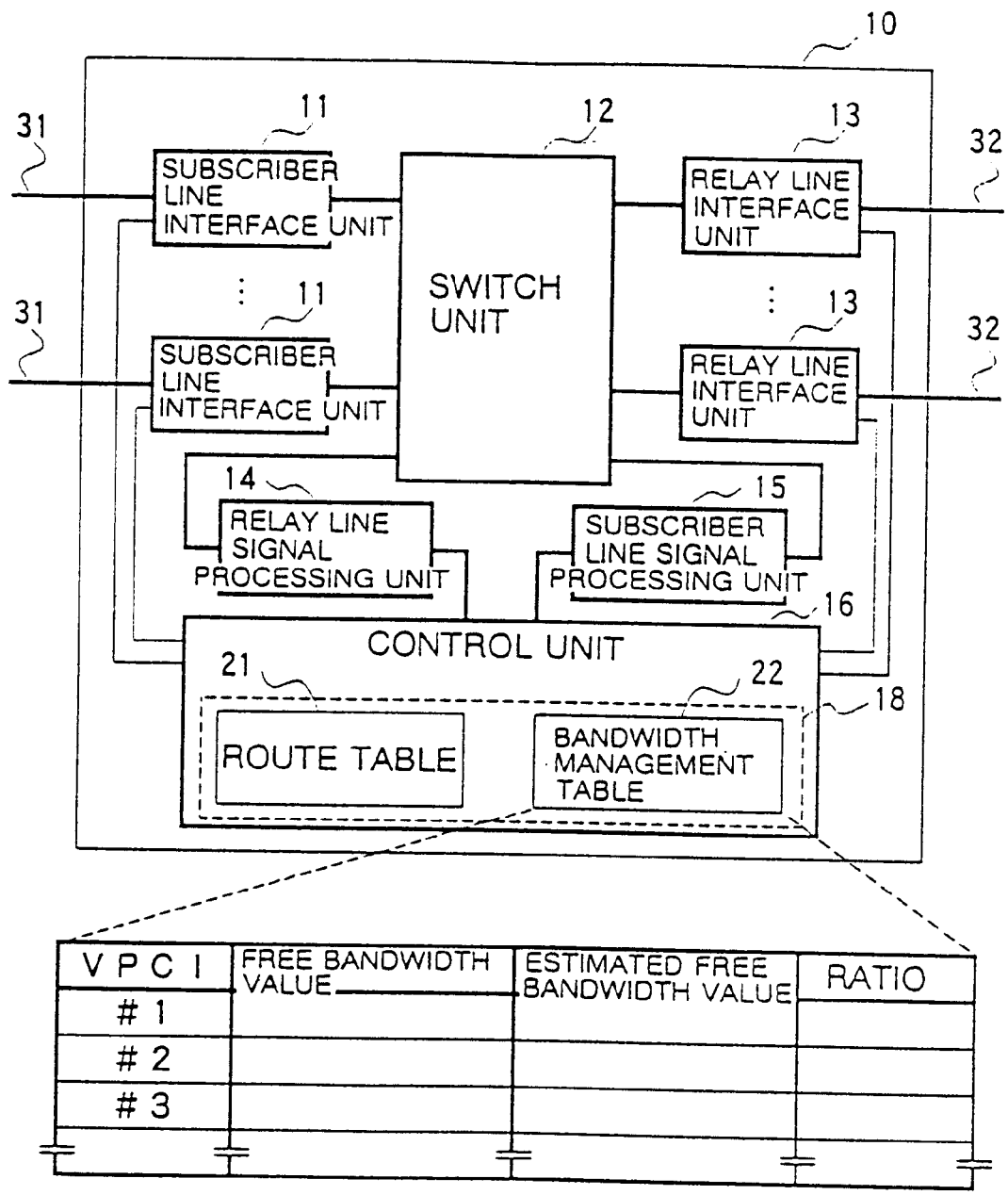
FIG. 1 is a block diagram showing a construction of an ATM switching apparatus in a first embodiment of the present invention.

FIG. 1 shows a construction of an ATM switching apparatus in accordance with a first embodiment of the present invention. As illustrated in FIG. 1, the ATM switching apparatus 10 in the first embodiment includes a subscriber line interface unit 11, a switch unit 12, a relay line interface unit 13, a relay line signal processing unit 14, a subscriber line signal processing unit 15, and a control unit 16. A plurality of the subscriber line interface units 11 and a plurality of the relay line interface units 13, are provided within the ATM switching apparatus 10. Each subscriber line interface unit 11 is connected via a subscriber line 31 to a subscriber terminal (unillustrated). Further, each relay line interface unit 13 is connected via a relay line 32 to other ATM switching apparatus (unillustrated).

The subscriber line interface unit 11 and the relay line interface unit 13 are circuits for executing cell synchronization, a header conversion and a multiplexing process with respect to receiving signals, and for executing a demultiplexing process, a buffering process and the cell synchronization with respect to transmitting signals. The switch unit 12 performs routing of ATM cells supplied from the subscriber line interface unit 11 or the relay line interface unit 13 in accordance with contents of headers thereof, and transmit the ATM cells onto a desired line via the subscriber line interface unit 11 or the relay line interface unit 13. Further, the switch unit 12 supplies the relay line signal processing unit 14 or the subscriber line signal processing unit 15 with an ATM cell (containing a specific item of information stored in the header) for a control signal.

The relay line signal processing unit 14 and the subscriber line signal processing unit 15 are circuits for executing an adaptation layer protocol process of the control signal between other ATM switching apparatus and the terminal.

The control unit 16 is constructed based on a processor (unillustrated) and a storage unit 18 as well, and executes control processes such as call establishing and releasing processes in accordance with the information supplied from the relay line signal processing unit 14 or the subscriber line signal processing unit 15.

Figure 2:
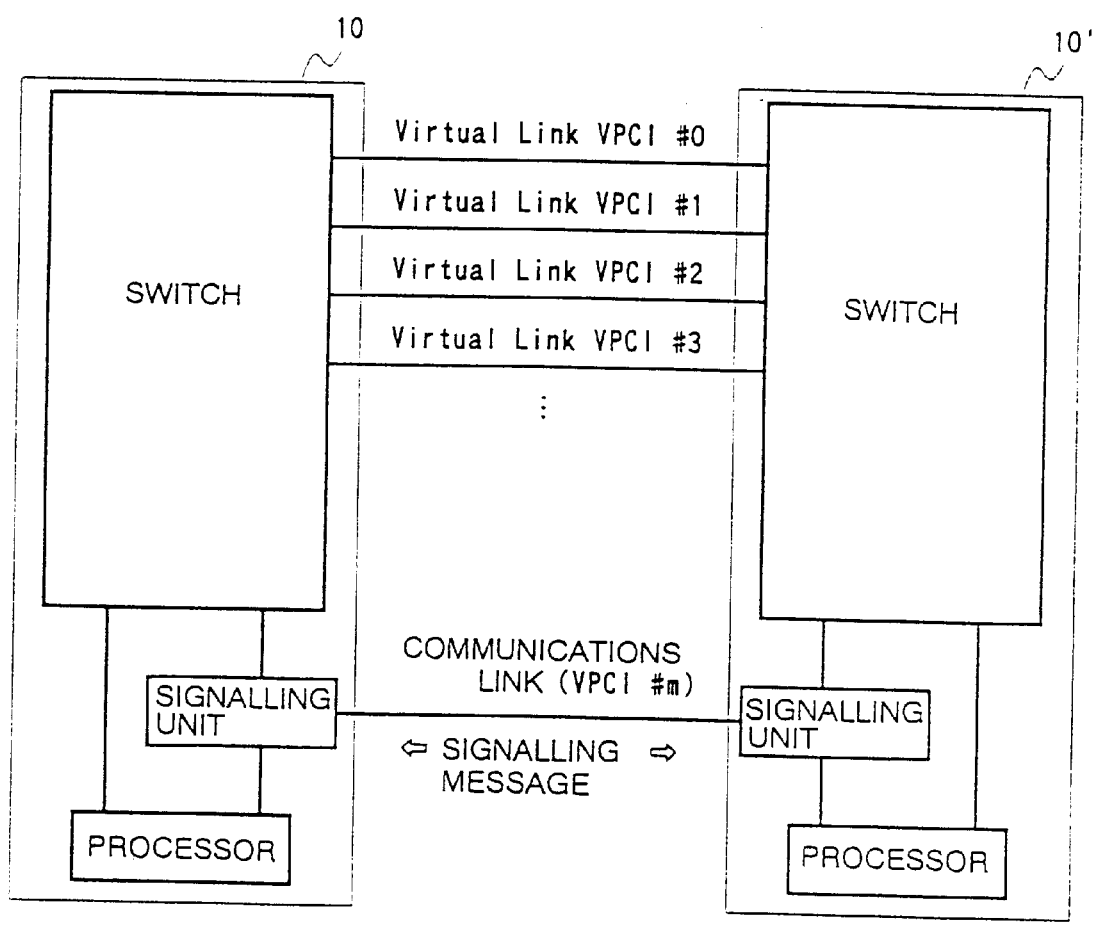
FIG. 2 is a block diagram showing a relationship between user data channels and a signalling channel, which is used to convey signalling messages for controlling the user data channels, of the ATM switching apparatus in the first embodiment.

That is, the ATM switching apparatus 10, as schematically shown in FIG. 2, uses a communications link (virtual path connection) identified by a VPCI #m to carry signalling messages for controlling a plurality of virtual links identified by VPCIs #0, #1, . . . for user data.

Referring back to FIG. 1, the description of construction of the ATM switching apparatus will now be continued.

The storage unit 18 is constructed of a semiconductor memory, a magnetic disk device and an optical disk device and so on, and is used to hold the information necessary for the call establishing and releasing processes, which information is represented by a route table 21 and a bandwidth management table 22. The route table 21 is stored with a corresponding relationship between a node number defined as a part of a calling number and VPCI (VPC identifier) defined as an identifier of a virtual path connection (VPC). A plurality of virtual path connections (VPCs) are prepared between the ATM switching apparatus 10 and other ATM switching apparatus, and hence the route table 21 is stored with a plurality of VPCIs for one node number.

The bandwidth management table 22 is a table for storing a free bandwidth value, an estimated free bandwidth value and a ratio corresponding to the VPCI. The free bandwidth value is a piece of information indicating a size of a band in an unused status in a maximum usable ban of the VPC identified by the corresponding VPCI. Although significance (applications) of the estimated free bandwidth value and the ratio will be explained later, at a start of an operation of the present ATM switching apparatus 10, the same initial value $R_{INIT}$ is set respectively in the bandwidth management table 22 as the ratio with respect to each VPCI. Note that a value of "1" or under is set as $R_{INIT}$ in principle. Further, a result of multiplication of $R_{INIT}$ and the corresponding free bandwidth value is set as the estimated free bandwidth value for each VPCI.

Hereinafter, an operation of the ATM switching apparatus 10 in the first embodiment will be explained. Note that the respective units exclusive of the control unit 16 of the ATM switching apparatus 10 carry out the same operations as those of the corresponding units within an ordinary ATM switching apparatus. Therefore, herein, the operation of the ATM switching apparatus 10 will be explained with an emphasis upon the operation of the control unit 16.

Figure 3:
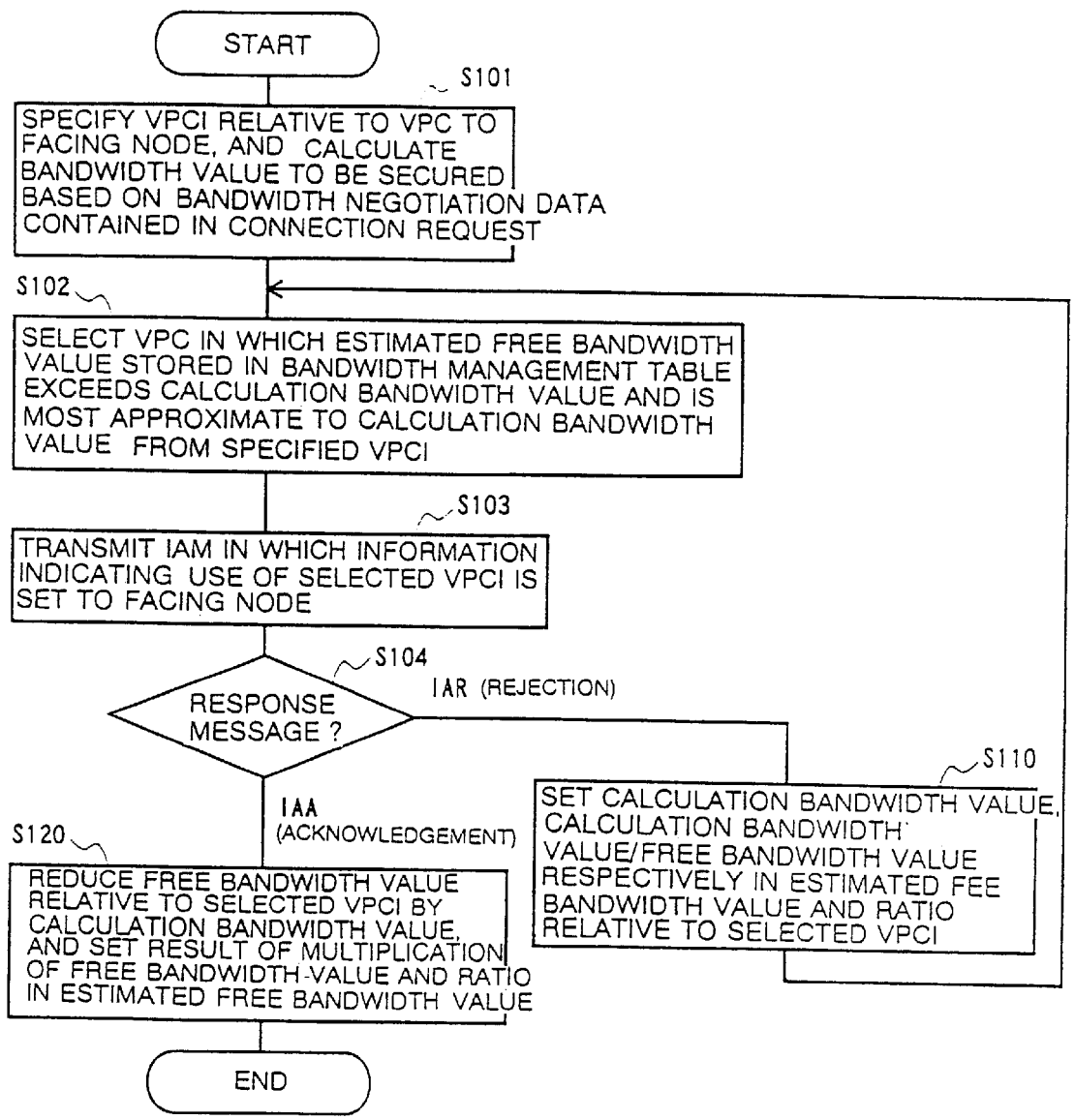
FIG. 3 is a flowchart showing operating procedures by a control unit when transmitting an IAM, which is provided in the ATM switching apparatus in the first embodiment.

FIG. 3 shows a flow of processes to be executed when detecting an occurrence of such an event that an IAM (Initial Address Message) should be outputted. Herein, the detection of the occurrence of the event in which the IAM should be outputted, implies that a receipt of a connection request (SETUP message or IAM) is detected, and that an acceptance of this connection request is determined.

In the case of accepting the connection request given from the terminal or other ATM switching apparatus, first, the control unit 16, as shown in FIG. 3, retrieves the route table 21 by use of the called party number designated in that connection request, thereby specifying the VPCIs concerning all VPCs provided between the ATM switching apparatus to which it belongs and a next ATM switching apparatus (which will hereinafter be termed a "facing node") to which the connection (a communications link) should be set up. Then, it calculates a bandwidth value to be reserved for the requested connection based on the broadband transmission capability, the ATM traffic descriptor (ATM cell rate) and so on (hereafter, referred to as the band negotiation data) that is stated in the connection request (step S101).

Subsequently, the control unit 16 reads the estimated free bandwidth values relative to the specified VPCIs from the bandwidth management table 22. Then, the control unit 16 compares each of the thus read estimated free bandwidth values with the calculated bandwidth value, and thereby selects one VPCI whose estimated free bandwidth value exceeds the calculated bandwidth value and is most approximate to the calculated bandwidth value (step S102). In step S102, when detecting a plurality of VPCIs whose estimated free bandwidth value exceeds the calculated bandwidth value and is most approximate to the calculated bandwidth value, the control unit 16 selects a VPCI having a minimum free bandwidth value (a maximum ratio). Note that the control unit 16, if unable to select the VPCI, transmits an IAR (IAM reject message), etc. to the node which has transmitted the connection request, however, an illustration pertaining to this process is omitted in the flowchart.

After selecting one VPCI, the control unit 16 transmits the connection request message, IAM, containing the selected VPCI to the facing node via the virtual channel (VC) for the signalling messages (step S103).

Figure 19:
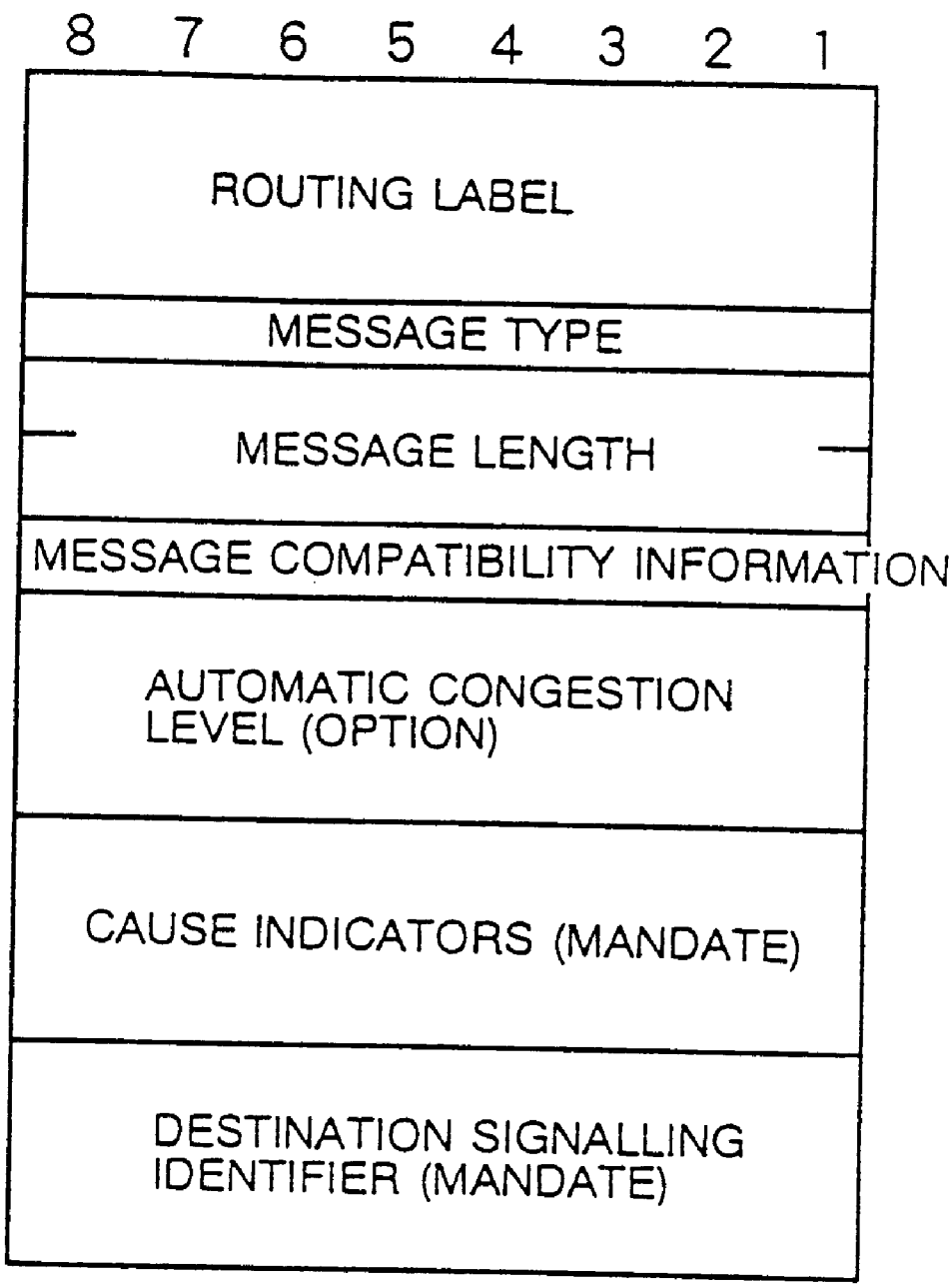
FIG. 19 is a explanatory diagram of an IAR message.

Then, when detecting the receipt of the IAR defined as a message for rejecting the connection request by way of a response message to that IAM (step S104: IAR), the control unit 16 sets the calculated bandwidth value as the estimated free bandwidth value relative to the selected VPCI within the bandwidth management table 22, and also sets a "calculated bandwidth value/free bandwidth value" as the ratio relative to the relevant VPCI within the bandwidth management table 22 (step S110). Then, the control unit 16 re-executes the processes starting from step S102. Note that the IAR is transmitted also when the connection can not be set to the next ATM switching apparatus from the facing node, but the control unit 16 judges which cause has had the received IAR transmitted, from cause indicators parameter set in the IAR (see FIG. 19).

When detecting a receipt of an IAA (IAM acknowledgement message) indicating that the connection request is accepted (step S104: IAA), the control unit 16 decreases the free bandwidth value relative to the selected VPCI in the bandwidth management table 22 by the calculated bandwidth value, and sets, in the estimated free bandwidth value relative to the relevant VPCI, a result of multiplication of the ratio and the reduced free bandwidth value (step S120), thus finishing the processes shown in FIG. 3.

Further, though not shown in FIG. 3, the control unit 16, when the call is released, increments the free bandwidth value of the VPC used by the connection established for this call, by the bandwidth value held for that connection, and changes the estimated free bandwidth value pertaining to that VPC so as to establish a relationship such as Estimated Free Bandwidth Value=Free Bandwidth Value×Ratio.

Hereinbelow, the operating procedures of the control unit 16 will be explained more specifically by exemplifying a case where the initial status of the bandwidth management table 22 is the one shown in FIG. 4(a). Note that the bandwidth management table 22 illustrated therein is the one in which "1" is used as the initial value of the ratio, $R_{INIT}$. Further, it should be assumed that VPCI#1–VPCI#3 shown in FIG. 4 are VPCIs for VPCs towards the same ATM switching apparatus (which will be referred to as a target facing node).

Under this status, it is assumed that the ATM switching apparatus 10 receives, at a certain time T0, a connection request A which requires to establish a connection to the target facing node, and contains a bandwidth negotiating data with which the control unit 16 calculates a bandwidth value of "9".

In this case, since the calculated bandwidth value is "9" and the content of the bandwidth management table 22 is the one shown in FIG. 4(a), the control unit 16 selects VPC #1 (VPC whose VPCI is #1) in step S102. Namely, the control unit 16 selects VPC #1 having a minimum difference between the estimated free bandwidth value and the calculated bandwidth value among the three VPCIs whose estimated free bandwidth value (=Free Bandwidth Value×Ratio) exceeds the calculated bandwidth value. Then, the control unit 16, in step S103, transmits to the target facing node an IAM containing parameter indicating the use of VPC #1 along with parameters holding the bandwidth negotiating data.

The target facing node receiving this IAM calculates a bandwidth value necessary for the requested connection by use of the bandwidth calculation algorithm implemented in the node itself. Then, if the calculated bandwidth value exceeds the free bandwidth value for the VPC #1, the target facing node returns an IAR to the ATM switching apparatus 10.

The control unit 16 which has detected the receipt of the IAR changes the estimated free bandwidth value in the bandwidth management table 22 with respect to VPC #1 to the calculated bandwidth value, i.d., "9". Further, the control unit 16 changes the ratio relative to VPC #1 to a calculated bandwidth value/free bandwidth value (=9/10= 0.9). That is, the control unit 16 changes the content of the bandwidth management table 22 to the one shown in FIG. 4(b).

Subsequently, the control unit 16 re-executes step S102. The estimated free bandwidth value of VPC #1 in the bandwidth management table 22 is rewritten to a value coincident with the calculated bandwidth value as shown in FIG. 4(b), and therefore the control unit 16, in step S102, selects VPC #2 different from that of the last time. Then, the control unit 16 transmits the IAM in which the parameter indicating the use of VPC #2 is set in step S103.

In this case, it follows that the ATM switching apparatus 10 receives an IAA as a response message to this IAM. Hence, the control unit 16 decreases the free bandwidth value relative to VPC #1 by the calculated bandwidth value, and sets "Free Bandwidth Value×Ratio" in the estimated free bandwidth value. Namely, the control unit 16 changes the content of the bandwidth management table 22 to the one shown in FIG. 4(c).

Then, thereafter, responses to the connection request and to the release request are made in the procedures described above, and therefore, in such a case that IARs concerning the respective VPCIs have been received and that releasing of the connections relative to VPCI#1–VPCI#3 has been finished during a period up to a certain time T (<T0+dT, where dT will be explained later in detail), as shown as one example in FIG. 4(d), it follows that the bandwidth management table 22 is stored with the same free bandwidth value as that in the initial status and with the ratio (as well as with the estimated free bandwidth value) different from that in the initial status.

Herein, it is considered a case where a connection request B, which contains bandwidth negotiation data causes the calculated bandwidth value of "8.5"–"10", is transmitted to the ATM switching apparatus 10 whose the bandwidth management table 22 is coincident with the one shown in FIG. 4(d). In other words, it is considered that the connection request B which makes the conventional ATM switching apparatus to send an IAM indicating the use of VPC #1 is transmitted to the ATM switching apparatus 10.

A ratio of a bandwidth value calculated based on a certain piece of bandwidth negotiation data within the ATM switching apparatus 10 to a bandwidth value (a facing node calculated bandwidth value) calculated based on this piece of bandwidth negotiation data within the target facing node, takes a value (not a fixed value) corresponding to a content of the same bandwidth negotiation data. Hence, there might be a possibility that a desired connection can be established in response to the connection request B by transmitting the IAM indicating that VPCI#1 is used. A probability thereof is, however, extremely low.

The control unit 16 in the present ATM switching apparatus 10, when detecting the receipt of the connection request B described above, selects VPC#2 whose estimated free bandwidth value (=Free Bandwidth Value×Ratio) is over the calculated bandwidth value, and transmits the IAM containing a parameter indicating the use of VPC#2. Namely, the control unit 16 responds to the connection request B without transmitting the IAM containing a parameter indicating the use of the VPC#1 which is a VPC with a high probability of the IAR being sent back.

Thus, in the present ATM switching apparatus 10, after ruling out the VPC (VPCI) with the high probability of the IAR being sent back from the selective target, a VPC (VPCI) used for establishing the connection is selected, and hence it follows that the connection establishment is completed at a high speed. Further, on such an occasion, since there must be selected the VPC with a small difference between the calculated bandwidth value and the estimated free bandwidth value, it follows that each VPC is utilized in such a form that a large free band is left.

Incidentally, as will be obvious from the discussion given above, in the present ATM switching apparatus 10, when the IAR is transmitted back, the estimated free bandwidth value (ratio) in the bandwidth management table 22 is rewritten to a smaller value. (The calculated bandwidth value set as an estimated free bandwidth value when receiving the IAR is smaller than the previous estimated free bandwidth value.) Also, the estimated free bandwidth value and the ratio are the data indicating a corresponding relationship in terms of the free bandwidth values between the ATM switching apparatus 10 and the facing node but are not the data directly indicating some sort of status on the side of the facing node.

Accordingly, when the control unit 16 is made to implement only the processes shown in FIG. 3, the estimated free bandwidth value (ratio) decreases every time the IAR is received, and hence it follows that there shifts to a state where the probability of the IAR being transmitted back from the facing node due to the bandwidth calculation algorithm, becomes smaller. Once the small value is set as the estimated free bandwidth value (ratio) relative to a certain VPC, however, this VPC thereafter becomes the one in which only a part of the band is usable. In order to prevent an occurrence of such a phenomenon, according to the present ATM switching apparatus 10, the control unit 16 incorporates a function to increase the value of each ratio by predetermined values (e.g., 0.01) so as not to exceed the initial value $R_{INIT}$ each time a predetermined time dT elapses, and to change the estimated free bandwidth value in accordance with the ratio. Owing to this function, the content of the bandwidth management table 22 shown in FIG. 4(d) is changed to the one shown in FIG. 4(e).

As discussed so far in greater detail, according to the ATM switching apparatus 10 in the first embodiment, with respect to the IAM that has indicated the use of a certain VPC, when receiving the IAR, the calculated bandwidth value is set in the estimated free bandwidth value relative to that VPC, and the calculated bandwidth value/free bandwidth value is set in the ratio within the bandwidth management table 22. Further, when the free bandwidth value changes as in the case of receiving the IAA, the estimated free bandwidth value is changed so as to establish "Estimated Free Bandwidth Value=Free Bandwidth Value×Ratio" without changing the ratio. Moreover, a predetermined value is added to the ratio at an interval of a predetermined time, and the estimated free bandwidth value is changed to establish "Estimated Free Bandwidth Value=Free Bandwidth Value×Ratio". Then, when the setting is requested, the VPC is selected by using not the free bandwidth value but the estimated free bandwidth value (=Free Bandwidth Value×Ratio). Therefore, when the present ATM switching apparatus 10 is employed, there gradually decreases the probability that the acceptance of the IAM is rejected due to the difference of the bandwidth calculation algorithm, and hence the call/connection setting can be implemented at the high velocity.

Incidentally, as stated above, the estimated free bandwidth value is a value calculable from the ratio and the free bandwidth value. Therefore, as a matter of course, the ATM switching apparatus 10 (the control unit 16) may be constructed so that the estimated free bandwidth value is calculated from the ratio and the free bandwidth value each time the estimated free bandwidth value is needed without providing a filed for storing the estimated free bandwidth value in the bandwidth management table. Further, the ATM switching apparatus 10 may be constructed not so that the predetermined value is added to the ratio every time the predetermined time elapses but so that the predetermined value is added to the ratio every time the IAA (or ANM) is received a predetermined number of times. Moreover, the ATM switching apparatus 10 may be constructed so that the ratio is set back to the initial value each time the predetermined time elapses or every time the IAA is received the predetermined number of times. Furthermore, the ATM switching apparatus 10 may be constructed so that the ratio is stored not for every VPCI but for every facing node.

<Second Embodiment>

The ATM switching apparatus in the first embodiment is so used as to be connected to the ordinary ATM switching apparatus. An ATM switching apparatus in accordance with a second embodiment is so employed as to be connected not to the ordinary ATM switching apparatus but to an ATM switching apparatus, such as the ATM switch apparatus in this second embodiment, incorporating a function to transmit the IAR containing the free bandwidth value of the VPC the use of which is indicated by the IAM on the side of the switching apparatus itself.

Figure 5:
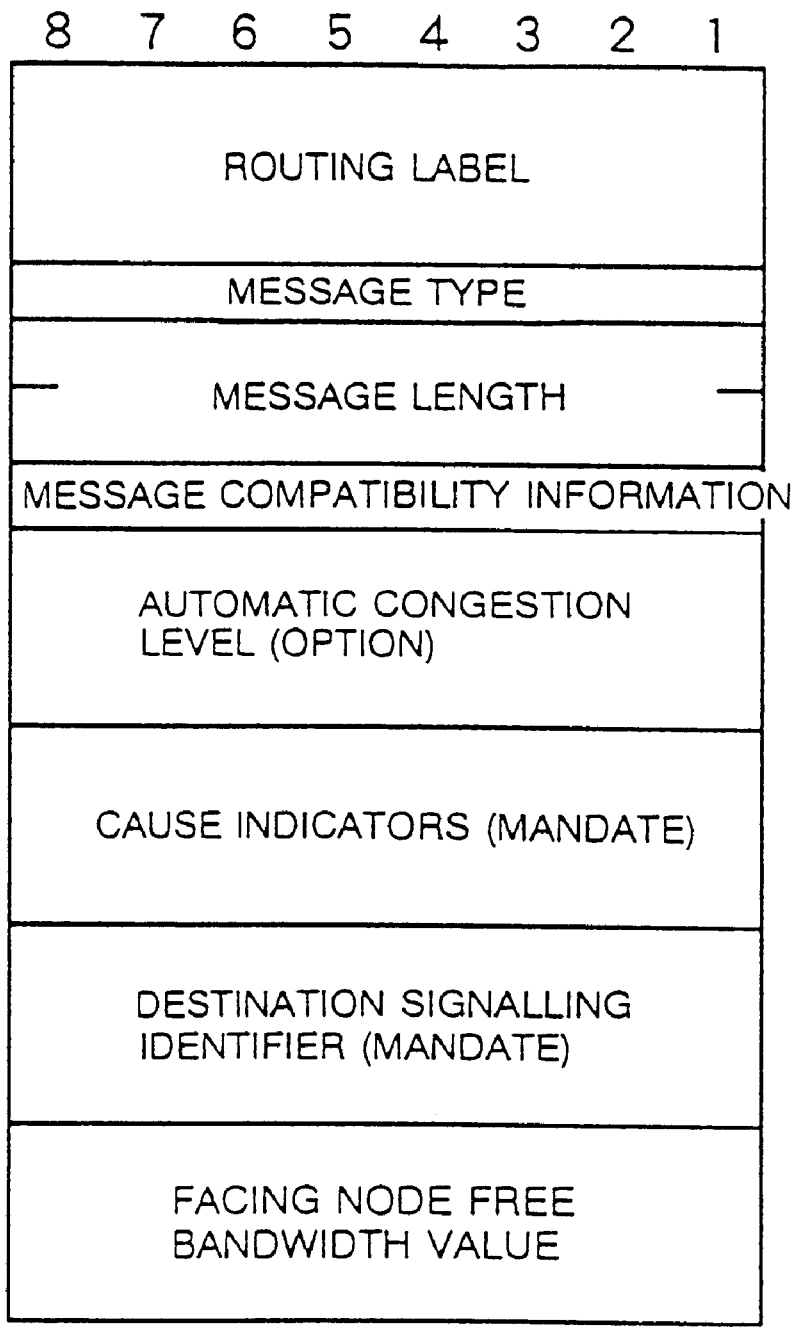
FIG. 5 is an explanatory diagram of IAR which is transmitted/received by an ATM switching apparatus in a second embodiment.

Specifically, each facing nodes is so constructed as to send the IAR, as shown in FIG. 5, containing a facing node free bandwidth value parameter which holds the free bandwidth value of the VPC the use of which is indicated by the IAM.

Figure 6:
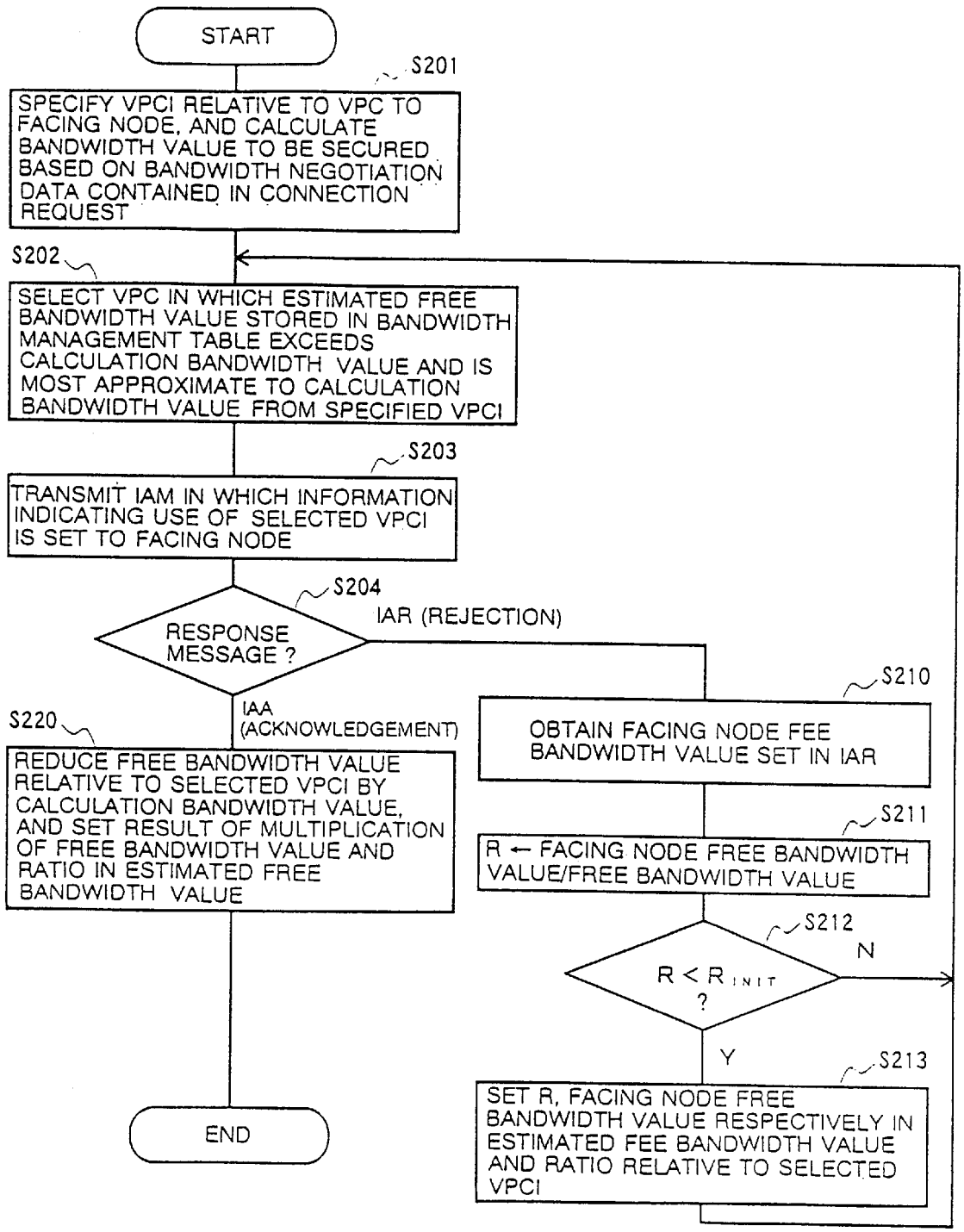
FIG. 6 is a flowchart showing the operating procedures by the control unit when transmitting the IAM, which is provided in the ATM switching apparatus in the second embodiment.

A basic construction of the ATM switching apparatus in the second embodiment is the same as that of the ATM switching apparatus in the first embodiment, and a control unit is provided inside with a bandwidth management table having the same structure as that of the bandwidth management table 22 provided within the control unit 16 in the first embodiment. A difference between these two types of ATM switching apparatuses is just only an operating procedure (an updating procedure of the content of the bandwidth management table), and hence only the operating procedure of the control unit is explained with referring to FIG. 6.

The control unit in the ATM switching apparatus in the second embodiment executes processes contents of which are different from those in the control unit 16 in steps S202 and S210 through S213 respectively corresponding to steps S102 and S110. Herein, for explanatory convenience, to start with, an operation (steps S210–S213) when receiving the IAR will be explained, and thereafter an operation in step S202 will be described.

When detecting the receipt of the IAR (step S204; IAR), the control unit reads the facing node free bandwidth value contained in the IAR received (step S210).

After reading the facing node free bandwidth value, the control unit 16 sets, in a variable R, a value obtained by dividing the thus read facing node free bandwidth value by a free bandwidth value relative to the selected VPCI in the bandwidth management table (step S211). Then, the control unit 16 compares in terms of magnitude the variable R with the initial value $R_{INIT}$ of the ratio (step S212). If $R<R_{INIT}$ (step S212; Y), the control unit 16 sets the variable R and the facing node free bandwidth value respectively in the ratio R(VPCI) and the estimated free bandwidth value in the bandwidth management table with respect to the relevant VPCI (step S213). Thereafter, the control unit 16 re-executes the processes starting from step S202. Whereas if $R<R_{INIT}$ is not satisfied (step S212; N), the control unit returns to step S202 without updating the content of the bandwidth management table.

More specifically, in the ATM switching apparatus in the first embodiment, the value (=Calculated Bandwidth Value/ Free Bandwidth Value) calculated for rewriting the ratio is invariably smaller than the ratio stored in the bandwidth management table. In contrast with this, the value R (=Facing Node Free Bandwidth Value/Free Bandwidth Value) calculated in the ATM switching apparatus in the second embodiment is not necessarily smaller than the ratio stored in the bandwidth management table. Further, the calculated value R may become larger than $R_{INIT}$ in some cases. Accordingly, if the value of the ratio is rewritten simply with R, it might be considered that the content of the bandwidth management table is updated to such a content that a probability of the IAR being sent might become higher. Therefore, in accordance with the second embodiment, as described above, the ATM switching apparatus (the control unit) is constructed so as to update the content of the bandwidth management table, only when the value R is smaller than $R_{INIT}$. Note that the reason why the ATM switching apparatus is not so constructed as to rewrite the bandwidth management table when R is smaller than the ratio at that point of time, is that a time zone with a small value of the ratio in the bandwidth management table can be controlled smaller in terms of the probability according to the present construction.

In step S202, the control unit 16, in the same way as step S102, makes a comparative judgement in terms of magnitude between the calculated bandwidth value and the estimated free bandwidth value relative to each VPCI to the facing node. The control unit 16 thereby selects one VPCI in which the estimated free bandwidth value exceeds the calculated bandwidth value and is most approximate to the calculated bandwidth value. However, as described above, in the present ATM switching apparatus, there might be a case where the estimated free bandwidth value is not updated, and therefore the control unit 16 selects one VPC from the VPCs excluding the VPCs selected in the past in response to the connection requests to be processed when executing step S202.

Thus, according to the ATM switching apparatus in the second embodiment, the information representing the status of the facing node more exactly than in the bandwidth management table in the first embodiment, is set in the bandwidth management table, and the VPC is selected by use of this item of information. Hence, the ATM switching apparatus in the second embodiment functions as a switching apparatus in which the phenomenon of the IAM being rejected due to the difference in the bandwidth calculation algorithm is much harder to occur than in the ATM switching apparatus in the first embodiment.

<Third Embodiment>

An ATM switching apparatus in accordance with a third embodiment is a modification of the ATM switching apparatus in the second embodiment. A storage unit of the ATM switching apparatus in the third embodiment is stored with a bandwidth management table in a format different from that in the second embodiment, and with a variable i (an initial value is "1") defined as data referred to when changing a content of this bandwidth management table and flag data F(VPCI) (an initial value is "0").

Figure 8:
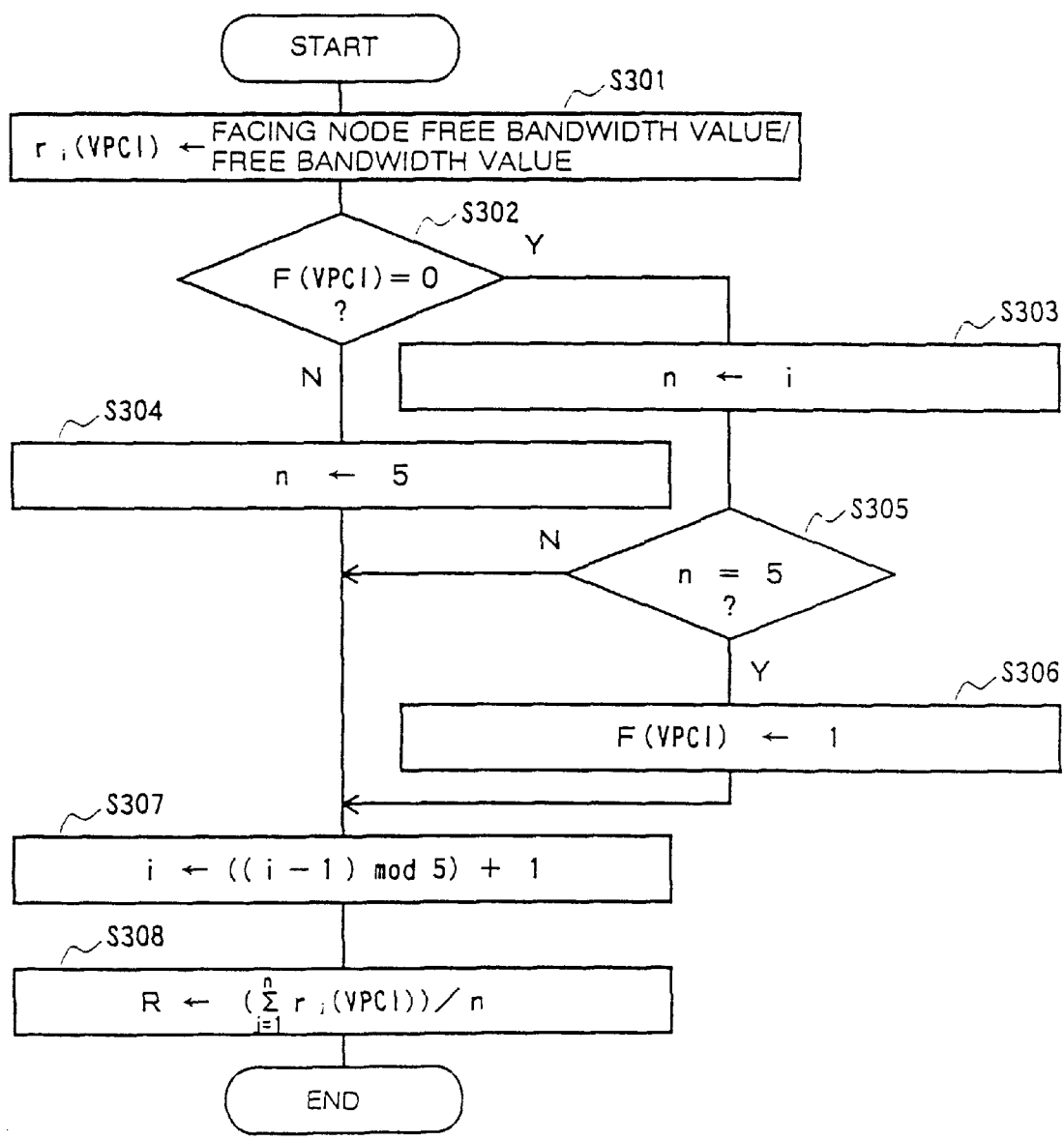
FIG. 8 is a flowchart showing a ratio calculating procedure in the ATM switching apparatus in the third embodiment.

FIG. 7 shows a structure of a bandwidth management table 22' provided in the ATM switching apparatus in the third embodiment. As shown in FIG. 7, the bandwidth management table 22' is a table into which five pieces of ratio data $r_1$–$r_5$ are added to the bandwidth management table (see FIG. 1) used in the first embodiment. Then, a control unit in the ATM switching apparatus in the third embodiment executes processes shown in FIG. 8 instead of step S211 in the flowchart shown in FIG. 6.

Namely, the control unit, after reading the facing node free bandwidth value from the received IAR (after executing step S210), to begin with, sets a facing node free bandwidth value/free bandwidth value in the i-th piece of data $r_i$(VPCI) on the selected VPCI in the bandwidth management table 22' (step S301).

Then, if F(VPCI) is "0" (step S302; Y), the control unit sets a value of a variable i in a variable n (step S303). Subsequently, the control unit judges whether a relationship such as n=5 is established or not (step S305). If not established (step S305; N), the control unit sets "((i−1)mod 4)+1" in the variable i (step S307). More specifically, in step S307, the control unit increments the value of the variable i by "1", and, if the value i after being incremented is "6", sets "1" in the variable i. Then, the control unit sets, in the variable R, a value obtained by dividing a sum of $r_1$(VPCI) through $r_n$(VPCI) by n (step S308), and advances to step S213 in FIG. 5. On the other hand, when n=5 (step S305; Y), the control unit sets "1" in a value of F(VPCI) (step S306), and executes processes subsequent to step S307.

Further, if F(VPCI) is not "0" (step S302; Y), the control unit sets "5" in the variable n (step S304) and executes the processes subsequent to step S307.

Namely, in the ATM switching apparatus in accordance with the third embodiment, when receiving the IAR to the IAM indicating the use of a certain VPC, a value of the variable R is obtained from an average value of the ratio data calculated from the facing node free bandwidth values set four times at the maximum in the IAR that was received in the past with respect to that VPC and of the ratio data calculated from the facing node free bandwidth value set in the received IAR. Then, as in the case of the ATM switching apparatus in the second embodiment, the comparative judgement in terms of magnitude between that variable R and $R_{INIT}$ is made. Only when R is smaller than $R_{INIT}$, the content of the bandwidth management table 22' is updated.

<Fourth Embodiment>

An ATM switching apparatus in a fourth embodiment is also a modification of the ATM switching apparatus in the second embodiment. A storage unit of the ATM switching apparatus in the fourth embodiment is stored with a bandwidth management table in a format different from those in the second and third embodiments.

FIG. 9 shows a structure of a bandwidth management table 22" provided in the ATM switching apparatus in the fourth embodiment. As shown in FIG. 9, the bandwidth management table 22" is a table storing four pieces of data each consisting of an estimated free bandwidth value (an estimated value) and a ratio, corresponding respectively to service classes (CBR, VBR, UBR, ABR) and the free bandwidth value with respect to each VPCI. Then, the control unit in the ATM switching apparatus in the fourth embodiment operates in procedures shown in FIG. 10 when transmitting the IAM.

Figure 10:
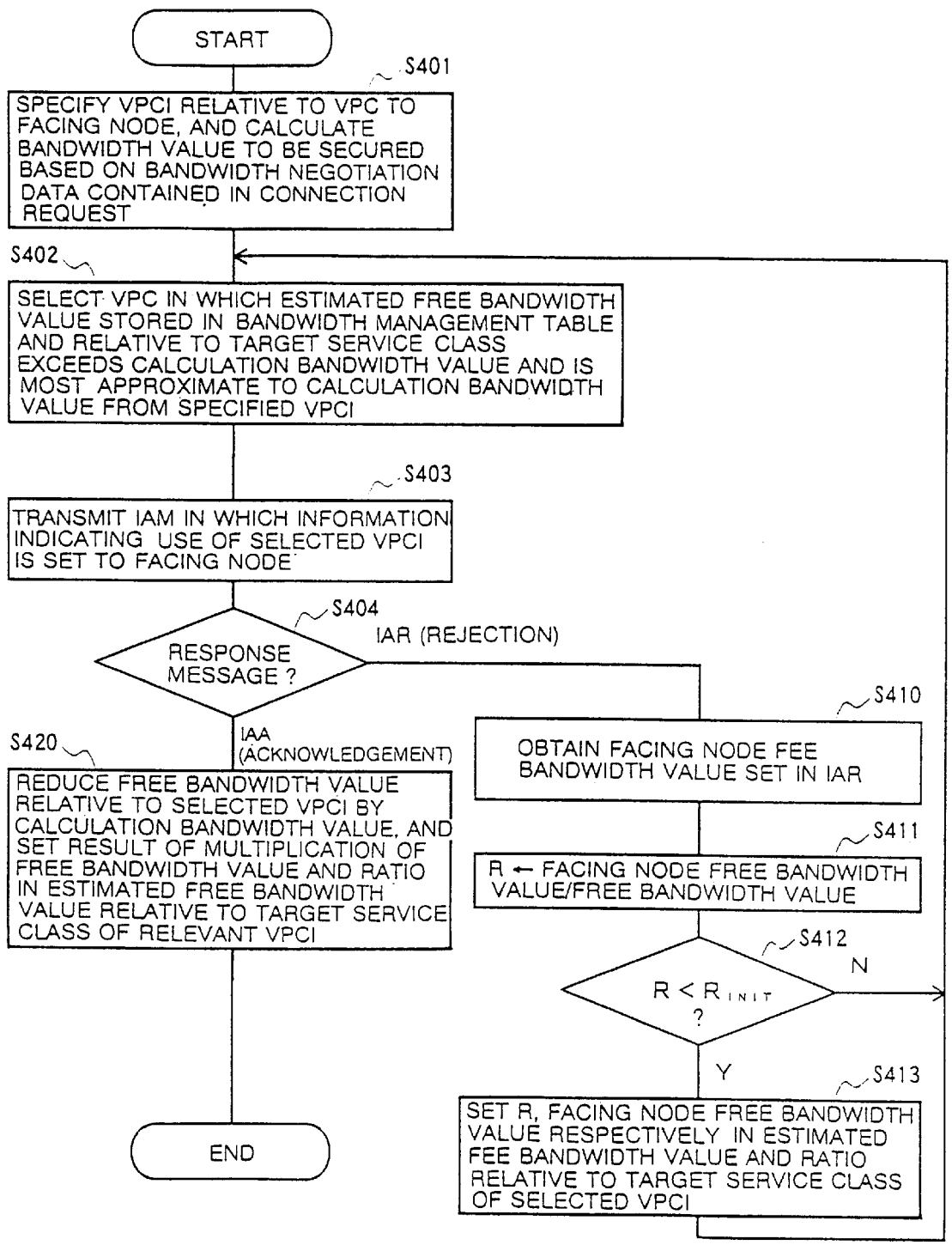
FIG. 10 is a flowchart showing operating procedures by the control unit when transmitting the IAM, which is provided in the ATM switching apparatus in the fourth embodiment.
Figure 11:
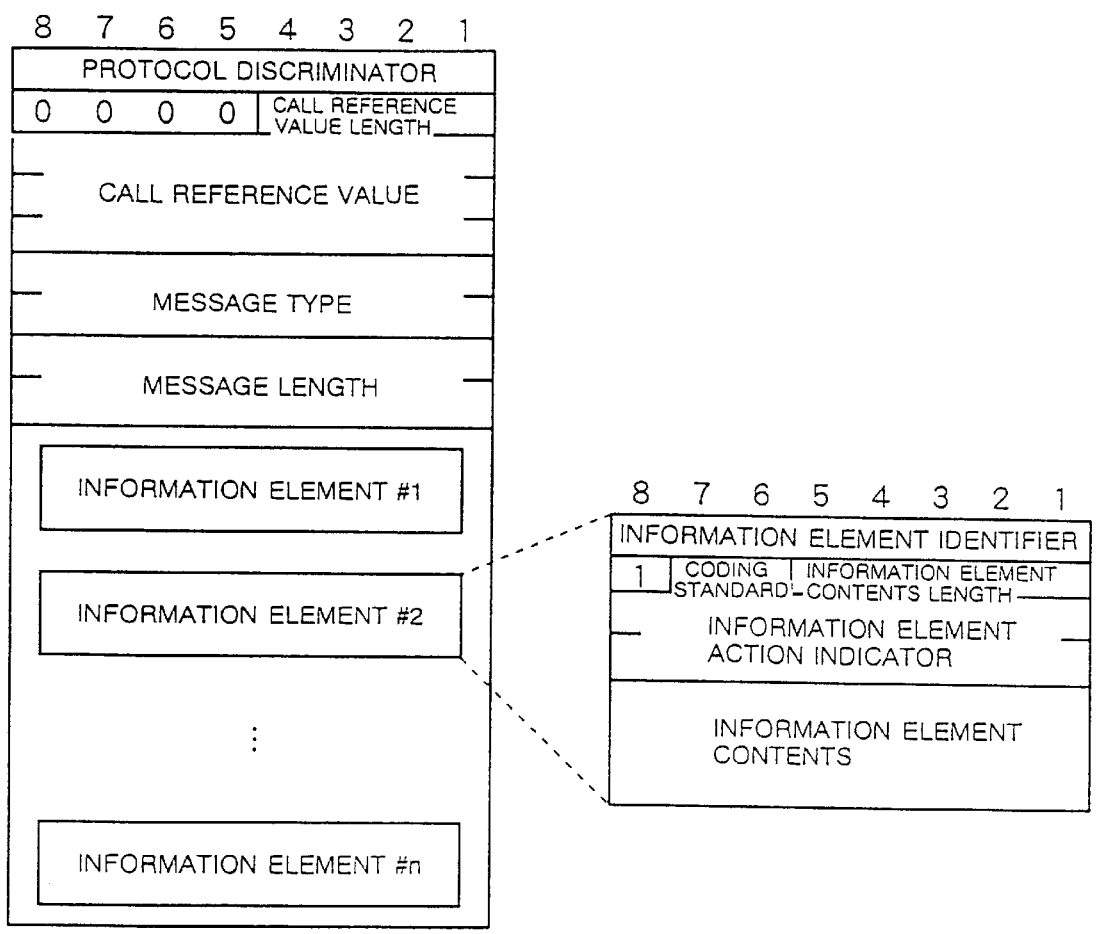
FIG. 11 is a diagram showing a format of a DSS2 message.
Figure 12:
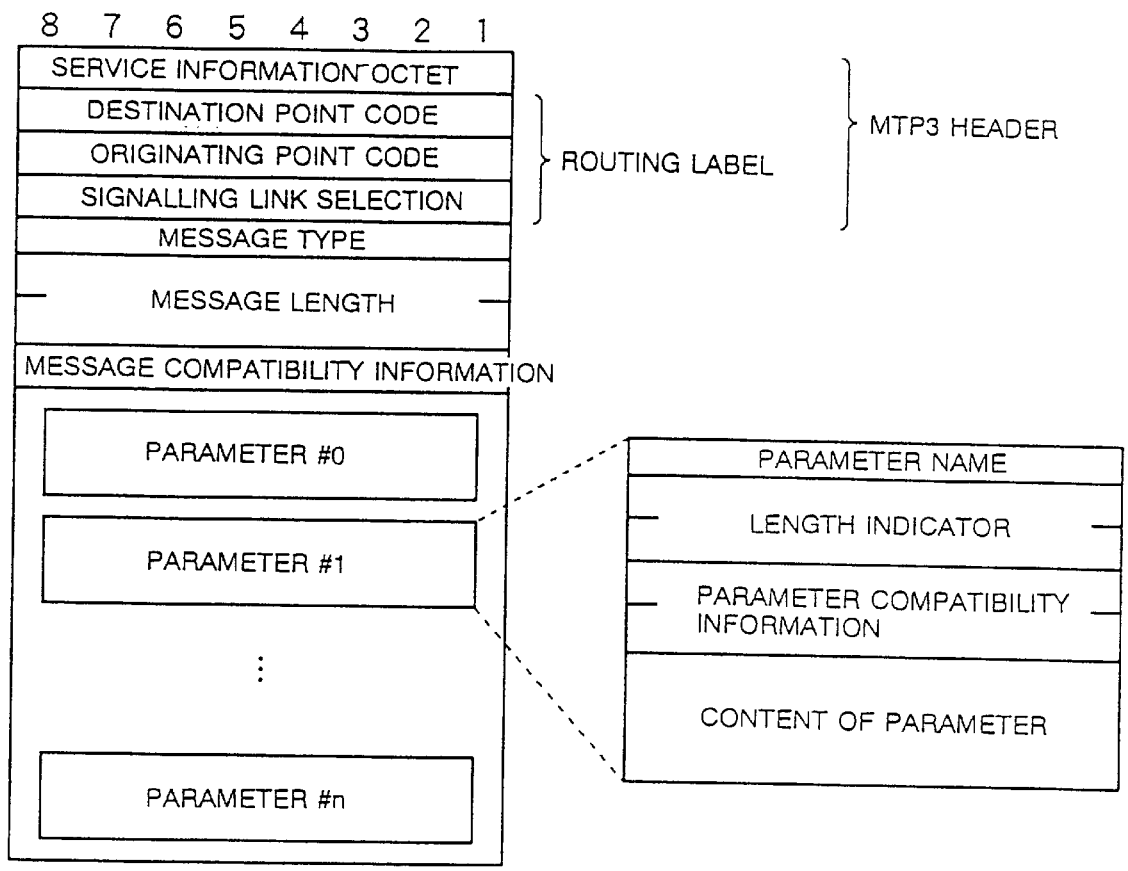
FIG. 12 is a diagram showing a format of a B-ISUP message.
Figure 13:
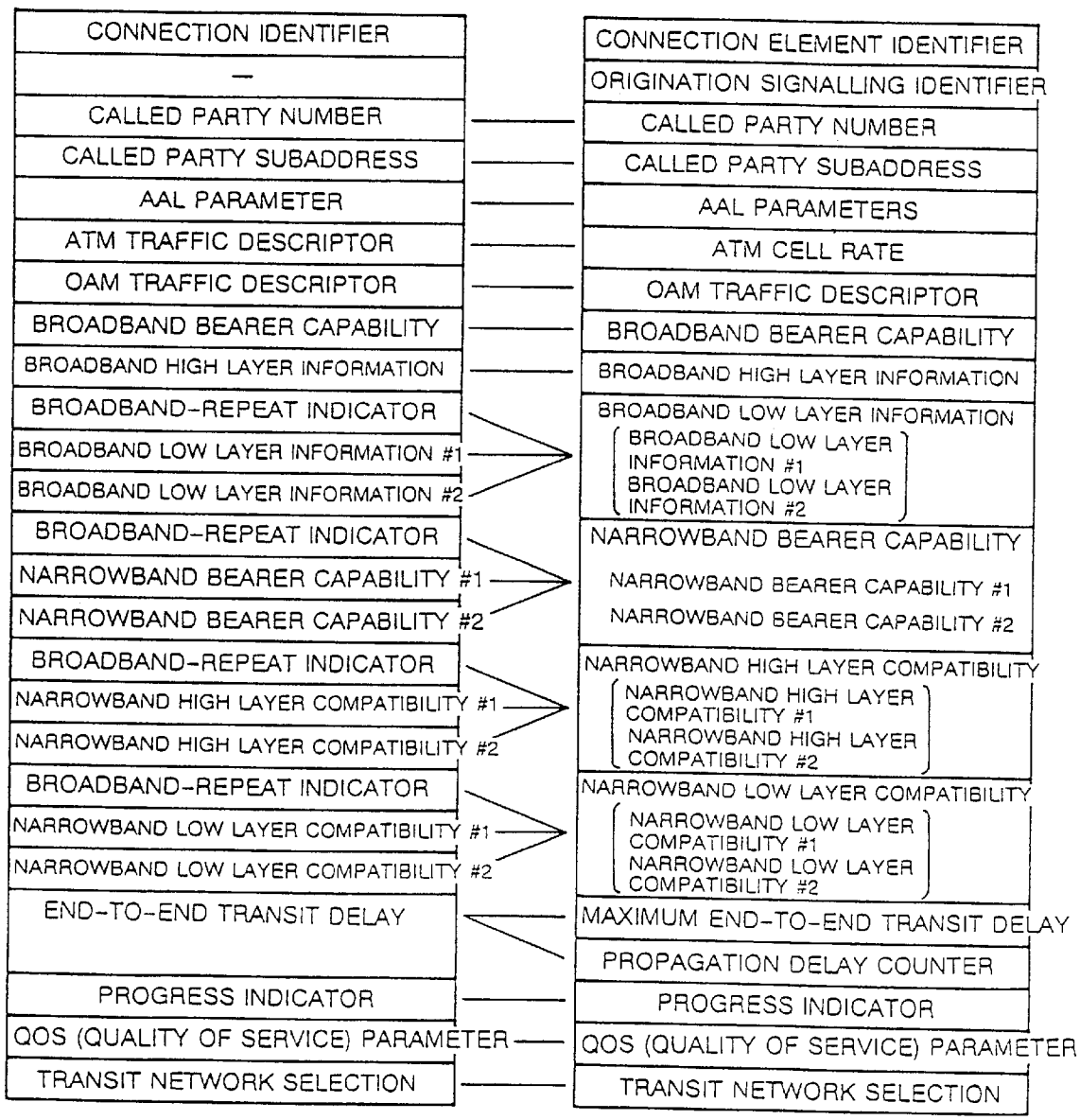
FIG. 13 is a diagram showing relationship between a SETUP message and a IAM.
Figure 14:
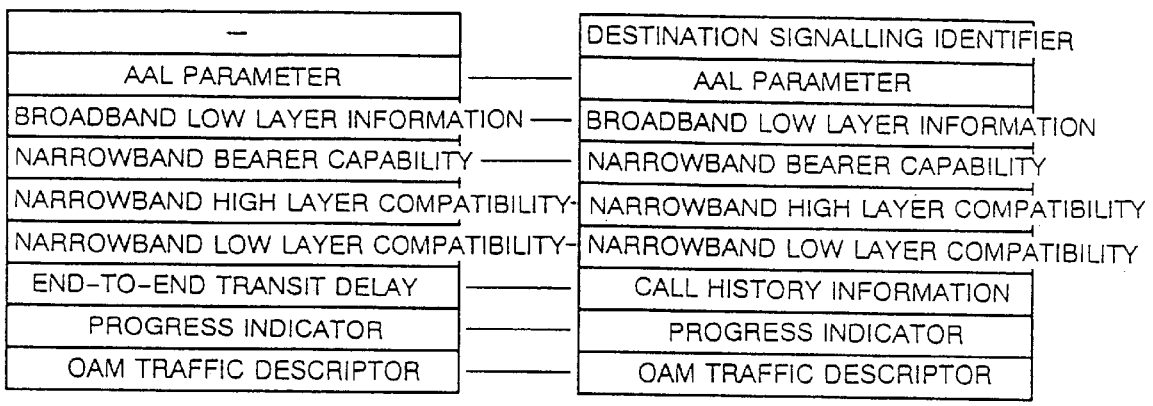
FIG. 14 is a diagram showing relationship between a CONNECT message and a ANM.
Figure 15:
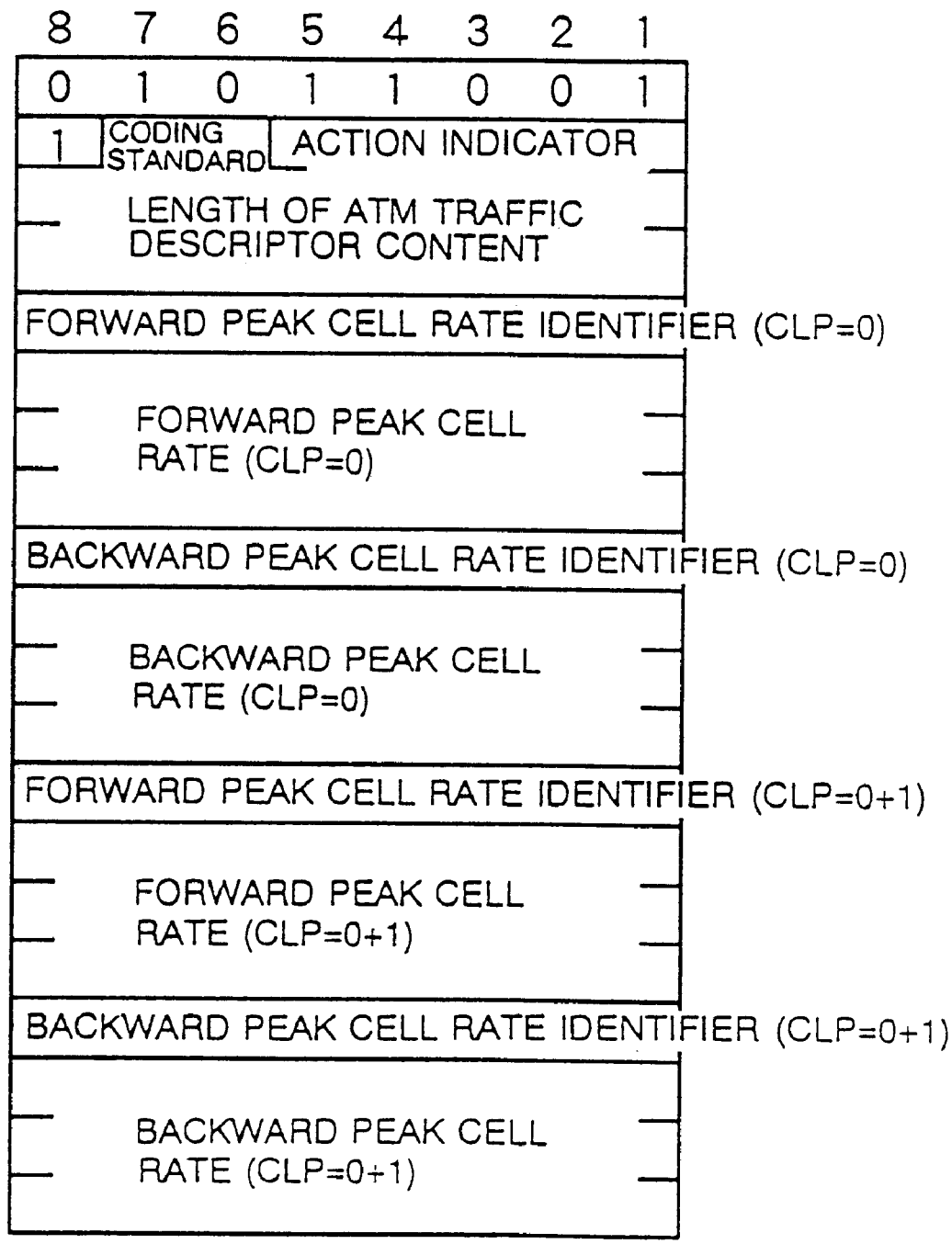
FIG. 15 is a explanatory diagram of an ATM traffic descriptor information element.
Figure 18:
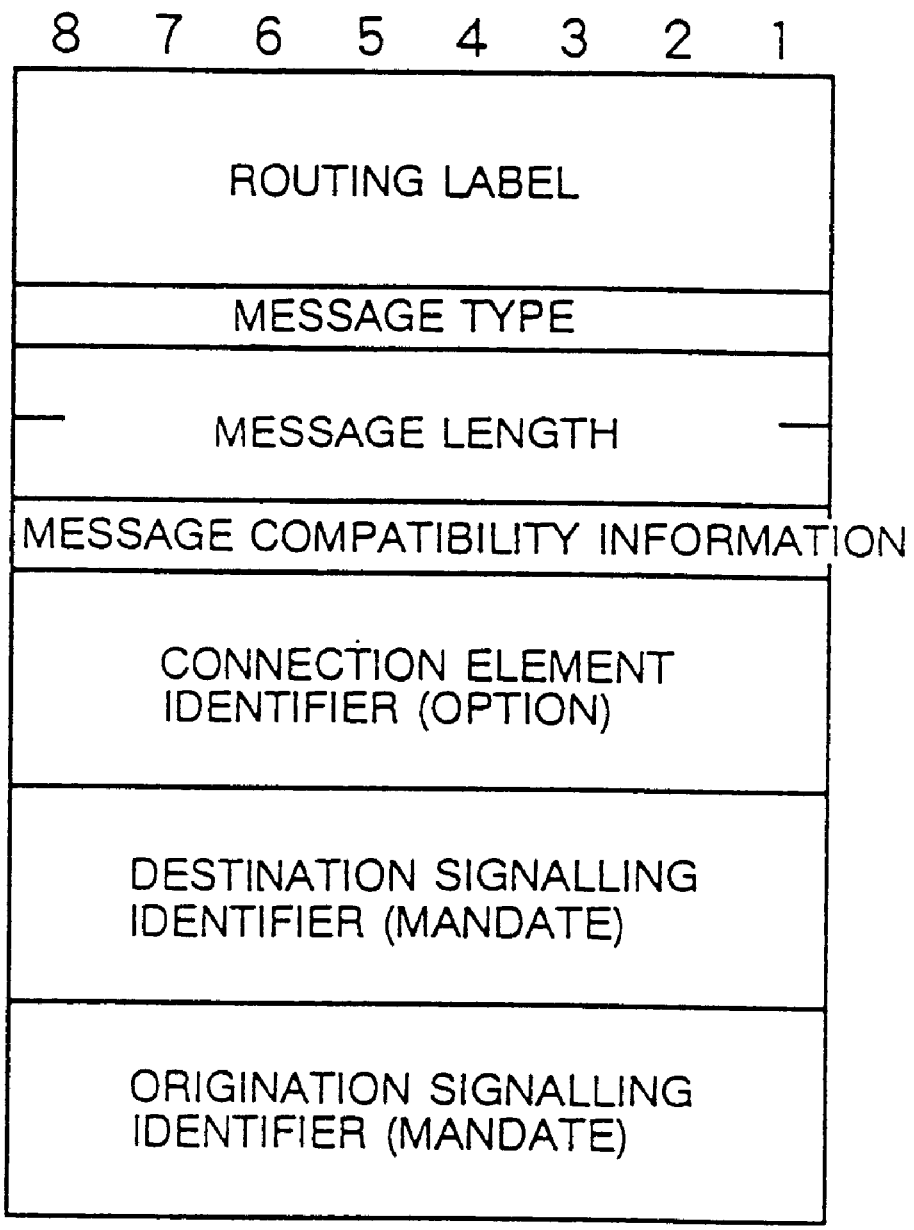
FIG. 18 is a explanatory diagram of an IAA message.

As shown in FIG. 10, the control unit, to begin with, specifies the VPCI of the VPC to the facing node from a calling number contained in the received connection request, and calculates a bandwidth value to be secured on the basis of the bandwidth negotiation data contained in the same connection request (step S401). Subsequently, the control unit selects VPCI in which the estimated free bandwidth value corresponding to the service class set in a broadband transmitting capability defined as one element of the bandwidth negotiation data, exceeds a calculated bandwidth value and is most approximate to the calculated bandwidth value (step S402). Then, the control unit transmits, to the facing node, the IAM in which the information indicating the use of the selected VPCI is set (step S403).

When receiving the IAR as a response to the IAM transmitted (step S404; IAR), the control unit reads the free bandwidth value (the facing node free bandwidth value) contained in the received IAR (step S410). Thereafter, the control unit sets, in the variable R, a value obtained by dividing the thus read facing node free bandwidth value by the free bandwidth value relative to the selected VPCI in the bandwidth management table (step S411). Then, the control unit compares the variable R with the initial value $R_{INIT}$ of the ratio in terms of the magnitude (step S412). When R<$R_{INIT}$ (step S412; Y), the control unit sets the variable R and the facing node free bandwidth value respectively in the estimated free bandwidth value and the ratio relative to the target service class of the relevant VPCI in the bandwidth management table 22" (step S413). Then, the control unit returns to step S402. Whereas if R<$R_{INIT}$ is not established (step S412; N), the control unit returns to step S402 without updating the content of the bandwidth management table.

When receiving the IAA as a response to the transmitted IAM (step S404; IAA), the control unit decrements the free bandwidth value concerning the selected VPCI in the bandwidth management table 22" by the calculated bandwidth value, and sets a result of multiplication of the ratio and the free bandwidth value after the value has been changed, in the estimated free bandwidth value relative to the target service class of the relevant VPCI (step S420). Then, the processes shown therein come to an end.

Namely, the ATM switching apparatus in the fourth embodiment execute the processes on a service-class basis, which have been implemented by the ATM switching apparatus in the second embodiment. In general, the bandwidth calculation algorithm is prepared for each service class, and hence, according to the ATM switching apparatus in the fourth embodiment, the probability that the acceptance of the IAM is rejected due to the difference in terms of the bandwidth calculation algorithm, can be controlled down to an extremely small value.

<Modified Embodiments>

The ATM switching apparatus in each of the embodiments can be modified in a variety of forms. For example, the ATM switching apparatus in the first embodiment is provided with the bandwidth management table shown in FIG. 6 or 9, whereby it is feasible to construct an ATM switching apparatus capable of executing the same processes as those executed by the ATM switching apparatuses in the third and fourth embodiments without receiving a notification of the free bandwidth value from the facing node. Note that in this case the control unit is programmed to use the calculated bandwidth value in place of the facing node free bandwidth value.

Further, the ATM switching apparatuses in the second through fourth embodiments can be modified to update the ratio not only when the IAM acceptance is rejected but also when the acceptance is approved. In this case, a function make IAA and ANM contain the information indicating the free bandwidth value, is added to other ATM switching apparatus.

Furthermore, the ATM switching apparatus may be constructed so that values exceeding "1" can be set as initial values of the ratio. That is, the ATM switching apparatus may be constructed so that the free bandwidth value is to be compared with the calculated bandwidth value with respect to the VPCI in which the free bandwidth value is smaller than the estimated free bandwidth value when selecting the VPCI.

As discussed above, it is possible to restrain small the probability that the acceptance of the connection request is ejected due to the difference in terms of the bandwidth calculation algorithm while keeping the status in which each VPC is effectively utilized by employing the ATM switching apparatus according to the present invention. Therefore, the setting of the call/connection can be implemented at the high velocity.

It is apparent that, in this invention, a wide range of different working modes can be formed based on the invention without deviating from the spirit and scope of the invention. This invention is not restricted by its specific working modes except being limited by the appended claims.

What is claimed is:

1. An ATM switching apparatus prepared with a plurality of virtual path connections to a facing node defined as other ATM switching apparatus, said ATM switching apparatus comprising:

storage means for storing facing node free bandwidth values and ratios relative to the plurality of respective virtual path connections;

calculating means for calculating, when receiving a connection request indicating to set up a connection to the facing node, a necessary bandwidth value defined as a bandwidth value necessary for the connection the basis of bandwidth negotiation data in the connection establishing request;

selecting means for selecting, from the plurality of virtual path connections, such a virtual path connection that a result of multiplication of the facing node free bandwidth value and the ratio that are stored in said storage means exceeds the necessary bandwidth value calculated by said calculating means and is most approximate to the necessary bandwidth value;

transmitting means for transmitting, to said facing node, a connection establishing request containing information indicating a use of the virtual path connection selected by said selecting means; and ratio rewriting means for rewriting, when receiving a rejection message indicating a rejection of acceptance of the connection establishing request transmitted by said transmitting means, a ratio stored in said storage means and relative to the virtual path connection selected by said selecting means into a value obtained by dividing the necessary bandwidth value by the facing node free bandwidth value relative to that virtual path connection.

2. An ATM switching apparatus used in combination with a facing node defined as an ATM switching apparatus for, when rejecting a request for setting a communications link, transmitting a rejection message in which to set a facing node free bandwidth value defined as a free bandwidth value of a virtual path connection indicated to be used at that setting request, and prepared with a plurality of virtual path connections to said facing node, said ATM switching apparatus comprising:

storage means for storing facing node free bandwidth values and ratios relative to the plurality of respective virtual path connections;

calculating means for calculating, when receiving a connection establishing request indicating to set up a connection to the facing node, a necessary bandwidth value defined as a bandwidth value necessary for the connection the basis of bandwidth negotiation data in the connection establishing request;

selecting means for selecting, from the plurality of virtual path connections, such a virtual path connection that a result of multiplication of the facing node free bandwidth value and the ratio that are stored in said storage means exceeds the necessary bandwidth value calculated by said calculating means and is most approximate to the necessary bandwidth value;

transmitting means for transmitting, to said facing node, a connection establishing request containing information indicating a use of the virtual path connection selected by said selecting means; and ratio rewriting means for rewriting, when receiving a rejection message indicating a rejection of acceptance of the connection establishing request transmitted by said transmitting means, a ratio stored in said storage means and relative to the virtual path connection selected by said selecting means into a value obtained by dividing the facing node free bandwidth value set in that rejection message by the free bandwidth value relative of the relevant virtual path connection.

3. An ATM switching apparatus according to claim 1, wherein said storage means is stored with free bandwidth values and a plurality of ratios corresponding to respective service classes with respect to the plurality of respective virtual path connections, said selecting means obtains a result of multiplication of the free bandwidth value and the ratio corresponding to the service class designated by the bandwidth negotiation data among the ratios relative to the plurality of virtual path connections stored in said storage means, and selects the virtual path connection in which the result of multiplication exceeds the necessary bandwidth value calculated by said calculating means and is most approximate to the necessary bandwidth value, and said ratio rewriting means rewrites a value of the ratio in said storage means which ratio corresponds to the service class designated by the bandwidth negotiation data in connection with the virtual path connection selected by said selecting means into a value obtained by dividing the necessary bandwidth value by the free bandwidth value relative to the relevant virtual path connection.

4. An ATM switching apparatus according to claim 1, further comprising ratio element data storage means for storing predetermined pieces of ratio element data with respect to the respective ratios stored in said storage means, wherein said ratio rewriting means rewrites the ratio element data written in the farthest past to said ratio element data storage means with the value obtained by the division, calculates a statistic value of the ratio element data stored in said ratio element data storage means, and rewrites a value of the target ratio with the calculated statistic value.

5. An ATM switching apparatus according to claim 1, wherein said selecting means, if there exist a plurality of virtual path connections in which the result of multiplication of the ratio stored in said storage means and the free bandwidth value exceeds the necessary bandwidth value calculated by said calculating means and is most proximate to the necessary, selects the virtual path connection with the maximum free bandwidth value.

6. An ATM switching apparatus according to claim 1, wherein said ratio rewriting means rewrites the value of the ratio only when the calculated value is smaller than the value of the ratio stored in said storage means.

7. An ATM switching apparatus according to claim 1, further comprising ratio changing means for changing the value of each ratio stored in said storage means into a ratio initial value at a interval of a predetermined time.

8. An ATM switching apparatus according to claim 1, further comprising ratio changing means for calculating a value into which a fixed value is added to the value of each ratio stared in said storage means at an interval of a predetermined time, changing the value of the ratio in which the calculated value does not exceed the ratio initial value into the calculated value, and changing the value of the ratio in which the calculated value exceeds the ratio initial value into the ratio initial value.

9. An ATM switching apparatus according to claim 1, further comprising ratio changing means for counting the number of acknowledgement messages per virtual path connections, which are transmitted from said facing node as a response to the connection establishing request transmitted by said transmitting means, and changing the value of the ratio relative to the virtual path connection in which a count value is over a predetermined count value, into the ratio initial value.

10. An ATM switching apparatus according to claim 1, further comprising ratio changing means for counting the number of acknowledgement messages transmitted from said facing node as a response to the connection establishing request transmitted by said transmitting means, calculating a value into which a fixed value is added to the value of the ratio relative to the virtual path connection in which a count value is over a predetermined count value, changing, if the calculated value does not exceed the ratio initial value, the value of the ratio relative to the relevant virtual path connection into the calculated value, and changing, if the calculated value exceeds the ratio initial value, the value of the ratio relative to the relevant virtual path connection into the ratio initial value.

11. An ATM switching apparatus according to claim 1, wherein said storage means is stored with a ratio used in common to the respective virtual path connections.

* * * * *